United States Patent [19]
Pal et al.

[11] Patent Number: 5,443,699
[45] Date of Patent: * Aug. 22, 1995

[54] METHOD FOR REFINING MOLTEN METALS AND RECOVERING METALS FROM SLAGS

[75] Inventors: Uday B. Pal, Needham; Kuo-Chih Chou, Cambridge; Shi Yuan, Cambridge; Zain Hasham, Cambridge, all of Mass.

[73] Assignee: Massachusetts Institute of Technology, Cambridge, Mass.

[*] Notice: The portion of the term of this patent subsequent to May 17, 2011 has been disclaimed.

[21] Appl. No.: 201,812

[22] Filed: Feb. 25, 1994

Related U.S. Application Data

[63] Continuation-in-part of Ser. No. 1,092, Jan. 6, 1993, Pat. No. 5,312,525.

[51] Int. Cl.⁶ .......................... C25C 3/34; H01M 6/00
[52] U.S. Cl. .................................... 204/64 R; 204/71; 204/141.5; 204/192.15; 429/101; 429/102; 429/103
[58] Field of Search .................. 204/71, 130, 141.5, 204/140, 192.15; 429/12, 101, 102, 103

[56] References Cited

U.S. PATENT DOCUMENTS

| | | | |
|---|---|---|---|
| 3,503,809 | 3/1970 | Spacil | 136/86 |
| 4,405,415 | 9/1983 | Dewing et al. | 204/67 |
| 4,454,015 | 6/1984 | Ray et al. | 204/293 |
| 4,455,211 | 6/1984 | Ray et al. | 204/293 |
| 4,462,878 | 7/1984 | Savov et al. | 204/140 |
| 4,468,298 | 8/1984 | Byrne et al. | 204/60 |
| 4,468,299 | 8/1984 | Byrne et al. | 204/60 |
| 4,596,647 | 6/1986 | Miller et al. | 204/212 |
| 4,614,628 | 9/1986 | Hsu et al. | 264/61 |
| 4,971,830 | 11/1990 | Jensen | 427/34 |

OTHER PUBLICATIONS

"Electronically Driven Transport of Oxygen from Liquid Iron to CO +CO₂ Gas Mixtures through Stabilized Zirconia", M. Iwase et al., pp. 517–524, 1981, *Metallurgical Transactions B*, 12B no month available.

"Electrochemical Deoxidation of Induction-Stirred Copper Melts", Oberg et al., pp. 75–82, 1983, *Metallurgical Transactions B*, 4 no month available.

"Electrochemical Studies and Processes Involving Oxygen in Liquid Metals", Odle et al., pp. 851–874, 1975, *Metal-Slag-Gas Reactions and Processes*, The Electrochemical Society, Inc., Princeton, N.J. no month available.

"The Indirect Electrochemical Refining of Lunar Ores", Semkow et al., pp. 2088–2089, 1987, *Journal of the Electrochemical Society*, 134 no month available.

"Recovery of Metal Values from Industrial Slags by the Use of a Two-Phase Molten Electrolyte System", Gomes et al., pp. 55–61, 1972, *Proceedings of the Third Mineral Waste Utilization Symposium, Chicago, Ill., Mar. 14–16, 1972*.

"The Diffusivity and Solubility of Oxygen in Liquid Copper and Liquid Silver from Electrochemical Measurements", Oberg et al., pp. 61–67, 1973, *Metallurgical Transactions B*, 4 no month available.

"The Diffusivity of Oxygen in Liuqid Copper by Electrochemical Measurements", Otsuka et al., pp. 147–149, 1976, *Metallurgical Transactions B*, 7B no month available.

"Interfacial Effects in Gaseous Reduction of PbO.SiO₂ Melts", Pal et al., pp. 693–700, 1983, *Metallurgical Transactions B*, 14B no month available.

(List continued on next page.)

*Primary Examiner*—Kathryn Gorgos
*Attorney, Agent, or Firm*—Florence Fusco McCann

[57] ABSTRACT

A method for electrochemical refining of an impurity-containing low carbon steel melt using a solid electrolyte ionic conductor to remove the impurity from the melt is provided. Also provided are an apparatus for performing the method, and a continuous method for electrochemical refining of a low carbon steel melt.

17 Claims, 12 Drawing Sheets

OTHER PUBLICATIONS

"Morphology and Electrochemistry of Porous Nickel/Zirconia Cermets", Middleton et al., pp. 90–98, 1989, *Proceedings of the First International Symposium on Solid Oxide Fuel Cells,* The Electrochemical Society, Inc., Princeton, N.J. no month available.

"Electrochemical Vapor Deposition of Yttria-Stabilized Zirconia Films", Pal et al., pp. 2937–2941, 1990, *Journal of the Electrochemical Society,* 137 no month available.

"Slag–Metal Emulsions and their Importance in BOF Steelmaking", Meyer et al., pp. 35–42, 1968, *Journal of Metals,* 20 no month available.

"Flotation of metal during injection of gases into liquid slags", J. M. Floyd, pp. C51–C52, 1973, *Transactions of the Institute of Mining and Metallurgy Sec. C,* 82 no month available.

"Copper recovery by flotation", Subramanian et al., pp. 33–38, 1972, *Journals of Metals,* 24. no month available.

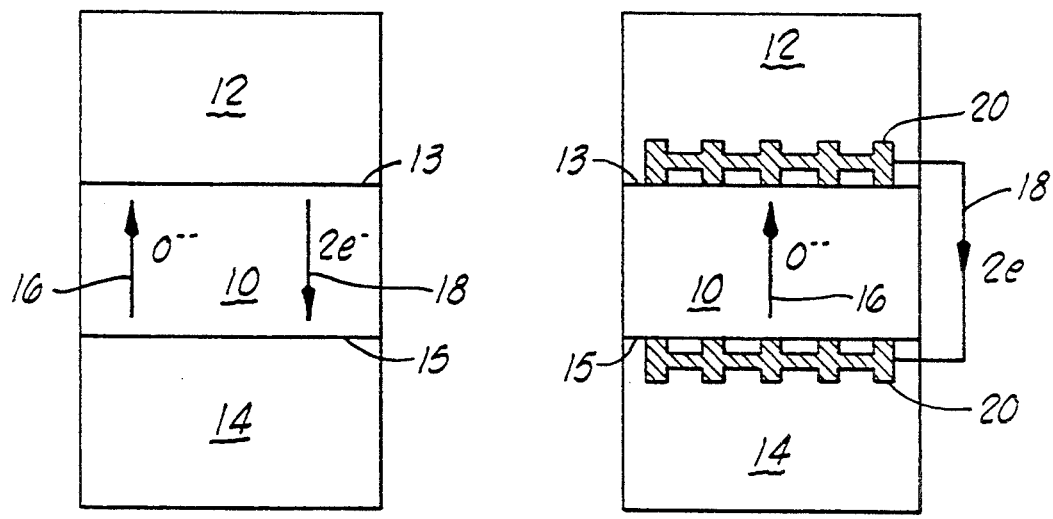
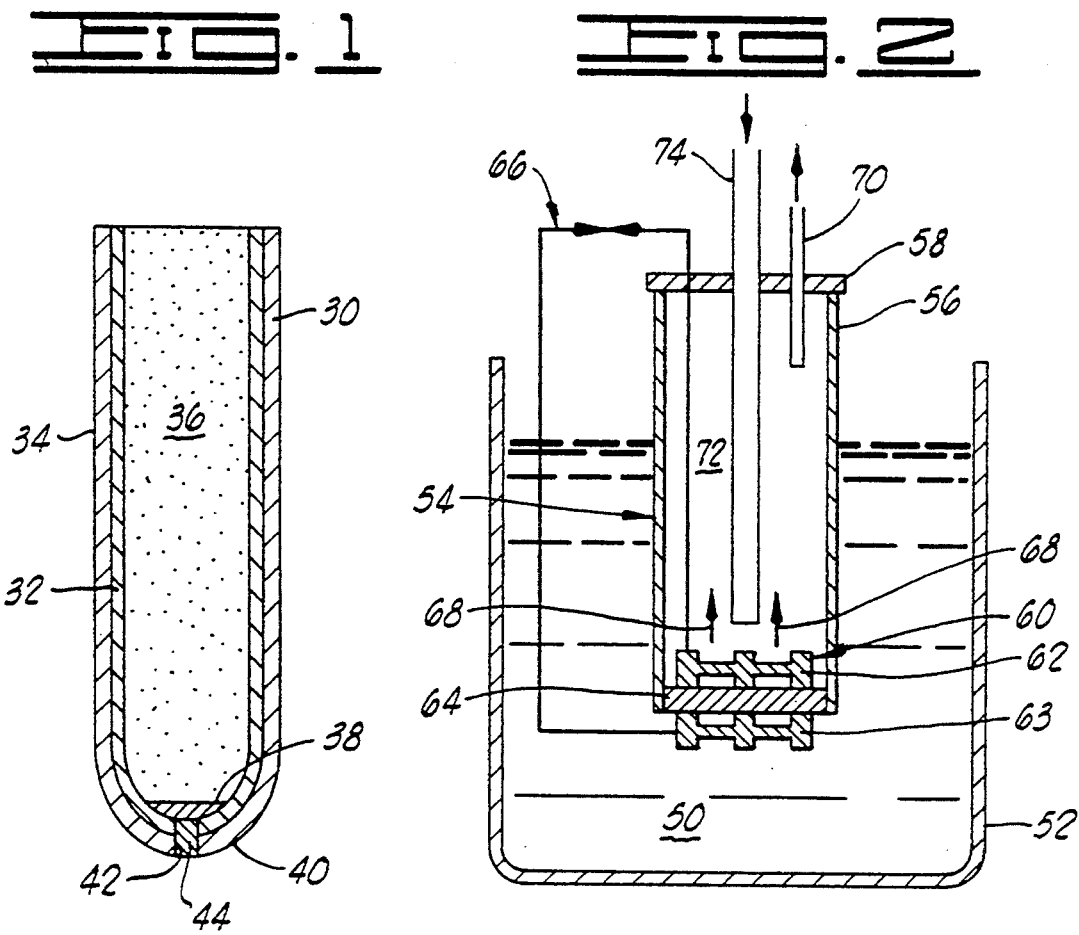

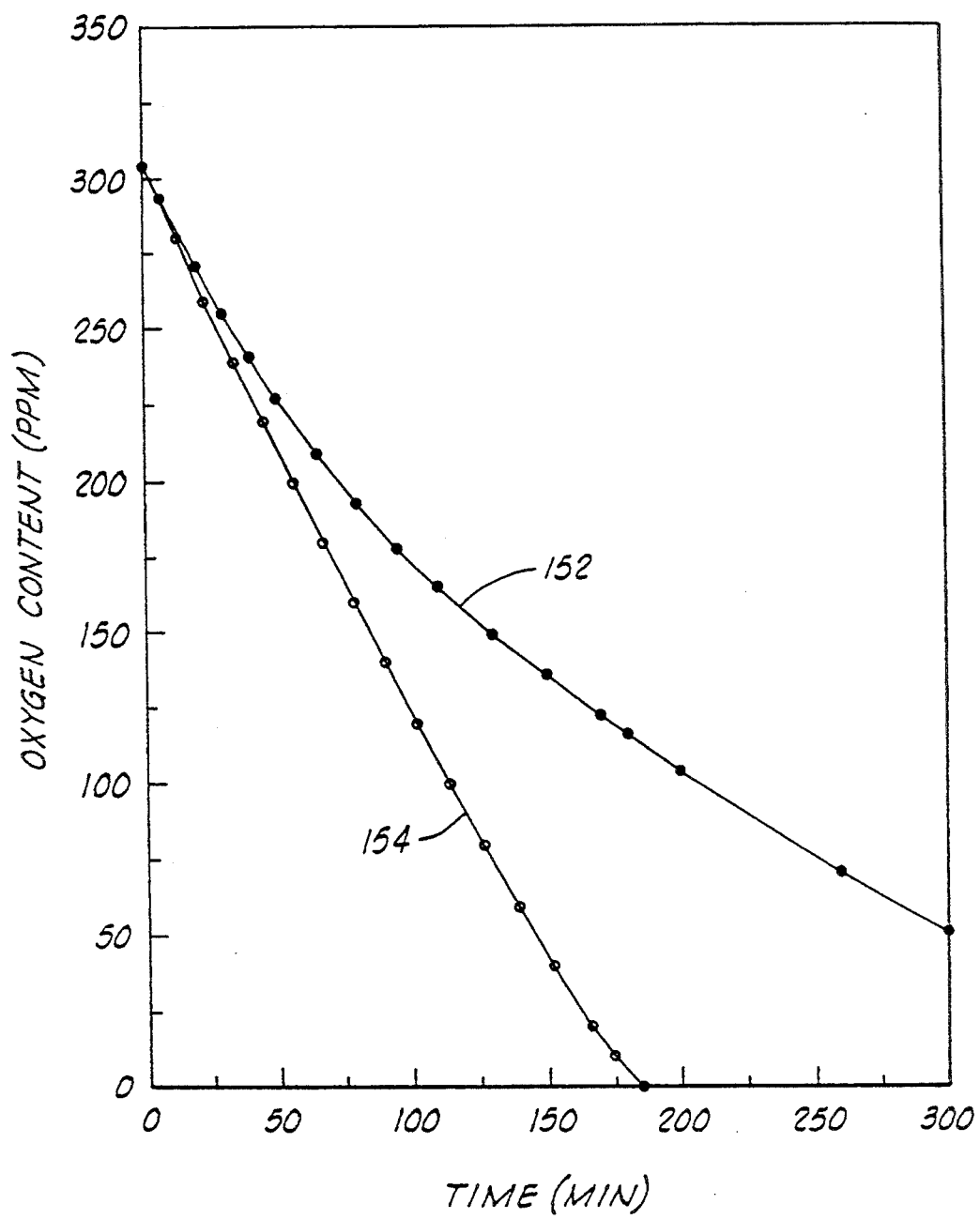
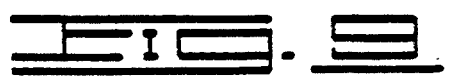

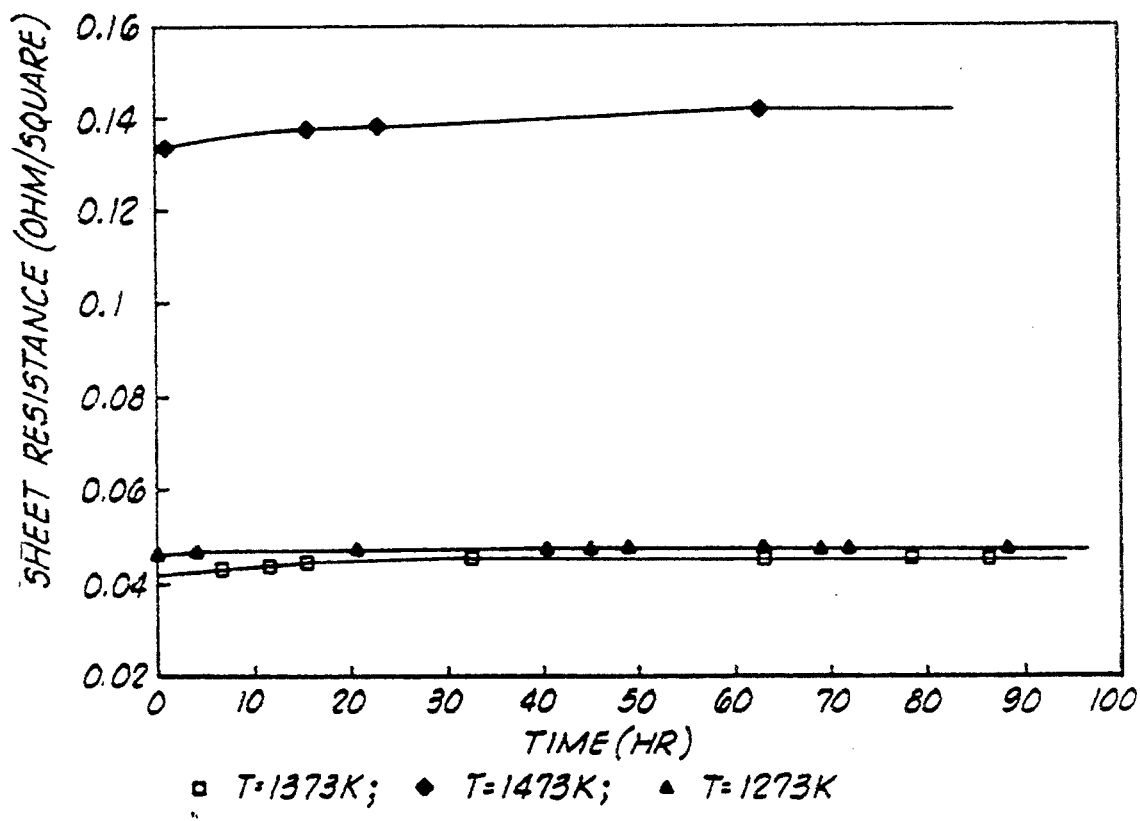
FIG. 14
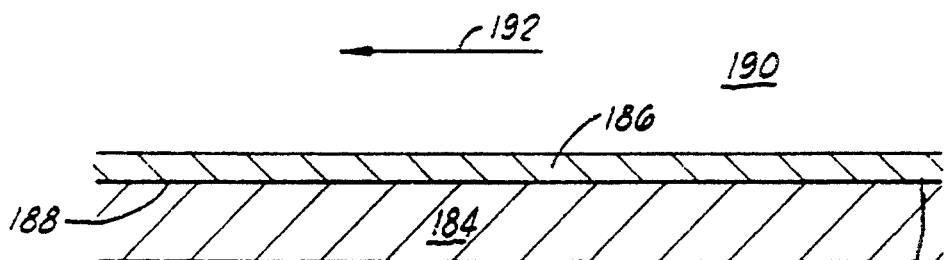
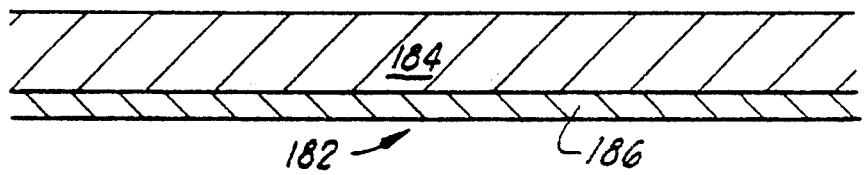
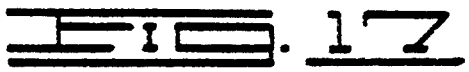
FIG. 17

FIG. 15
BEFORE ANNEAL
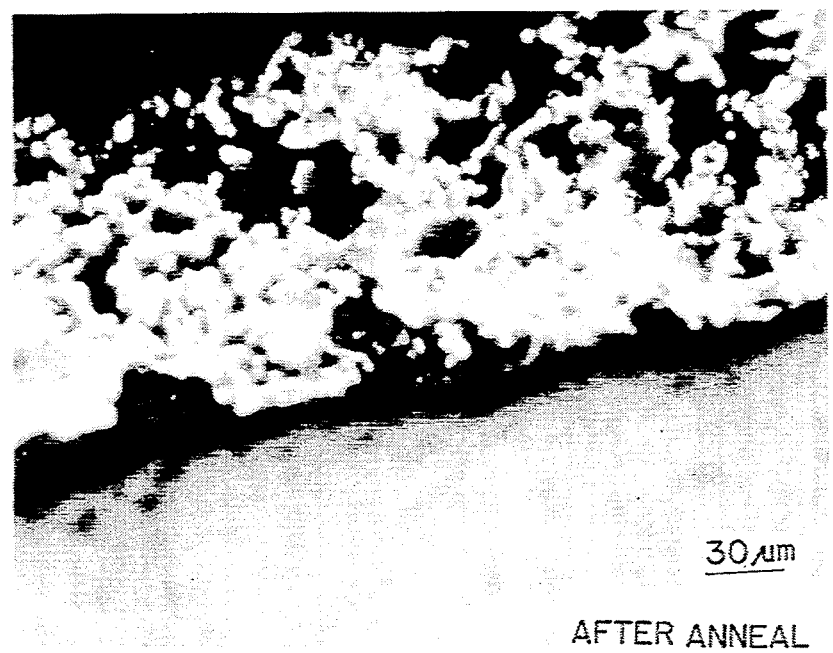
AFTER ANNEAL
FIG. 16

METHOD FOR REFINING MOLTEN METALS AND RECOVERING METALS FROM SLAGS

This application is a continuation-in-part of Ser. No. 08/001,092 filed Jan. 6, 1993, now U.S. Pat. No. 5,312,525.

BACKGROUND OF THE INVENTION

1. Field of the Invention

The invention relates to methods for refining molten metals and for recovering metals from slags. More particularly, the invention relates to electrochemical methods for refining molten metals and recovering metals from slags.

2. Description of the Prior Art

Requirements for metals having improved physical and mechanical properties necessitate production of metals having low, in the range of from about 100 ppm to less than about 5 ppm, concentrations of undesirable elements such as oxygen, hydrogen and sulfur.

Several technologies currently exist for removal of impurities such as oxygen; hydrogen and sulfur from molten metals. One of these molten metal refining techniques is vacuum degassing, a capital-intensive technique limited by the vacuum pressure that can be created over the molten metal. Other known molten metal refining techniques are "gettering" techniques wherein a reactive metal forms more stable compounds with the impurity element than the original impurity compound present in the unrefined melt and, thereby, generates new compounds of the impurity element. Disadvantages of "gettering" techniques are the high cost of typical reactive metals, such as silicon, aluminum, manganese and calcium, as well as the presence of new impurity element compounds which can remain in the melt as inclusions if additional processing steps to remove the new impurity element compounds are not taken. Such additional processing steps introduce further complexity in the refining process and can produce undesirable effects such as incomplete removal of an impurity element and inclusion compounds and generate environmentally harmful by-products such as dust, slags and undesirable gases.

Existing electrochemical techniques for deoxidation of metals, such as that described by Iwase et al., "Electronically Driven Transport of Oxygen from Liquid Iron to $CO+CO_2$ Gas Mixtures through Stabilized Zirconia", Metallurgical Transactions B, 12B, 517–524 (1981) have an oxygen removal flux which is rate limited by residual electronic transport in the electrolyte and are unacceptable from a commercial standpoint. No external electrodes or short-circuiting thereof is used. Under these conditions, residual electronic transport is one-tenth of oxygen ion transport. Other electrochemical deoxidation techniques, such as that described by Oberg et al., "Electrochemical Deoxidation of Induction-Stirred Copper Melts", Metallurgical Transactions B, 4, 75–82 (1973), require that an electric potential be applied between the melt and an electrode, as in an electrolysis process, to pump oxygen out of the melt and into the air and are, thus, less energy efficient than a galvanic cell operated without any external electromotive force.

The ever rising demand for metals coupled with an increasing scarcity of available mineral resources makes the salvaging of metal losses in metal oxide slags of great practical significance. A recent trend has been to increase the rate of metal production in pyrometallurgical operations by the use of pneumatic systems, such as basic oxygen steelmaking processes which have replaced earlier relatively quiescent slag-metal processes such as the open hearth steelmaking process. While pneumatic processes are desirable to increase productivity, they, in general, also increase loss of valuable metals and metal oxides, as is also well documented for non-ferrous metals such as tin and copper as described by Meyer et al., "Slag-Metal Emulsions and their Importance in BOF Steelmaking", Journal of Metals, 20, 35 (1968) and Floyd et al., "Flotation of metal during injection of gases into liquid slags", Transactions of the Institute of Mining and Metallurgy Sec. C, 82 C51 (1973).

Presently available methods for recovering metals from metal oxide slags include gaseous reduction of the slag as described in Subramanian et al., "Copper recovery by flotation", Journal of Metals, 24, 33 (1972); however, this technique is undesirable from the standpoint of contamination of the metal with the reducing gas and generation of environmentally harmful by-products such as dust and toxic gases.

Thus, there exists a need for inexpensive, energy-efficient, and environmentally sound molten metal refining techniques which do not generate impurity element compounds as a by-product which can be included in the refined metal. A need also exists for energy-efficient and environmentally sound techniques for metal recovery from slags.

SUMMARY OF THE INVENTION

The invention provides a method for electrochemically refining a melt including steps of providing a melt which contains a particular concentration of an impurity, exposing the melt to a refining device which includes a solid electrolyte ionic conductor which has the same impurity as is contained within the melt as its ionically conductive species. The solid electrolyte ionic conductor is in electrical contact with at least one electrode which is exposed to a refining gas. The electrode can be short-circuited to the melt or to a second electrode. The refining device is further equipped with a refining gas inlet and exhaust gas outlet. The refining gas is supplied through the refining gas inlet and has an impurity concentration different from the impurity concentration in the melt and selected so transport of the impurity occurs out of the melt through the solid electrolyte ionic conductor, resulting in removal of the impurity from the melt and production of a refined melt characterized by a third impurity concentration. The impurity is transported out of the device via the refining gas.

In another aspect of the invention, apparatus for electrochemical refining of a melt containing a particular concentration of an impurity is provided. The apparatus includes a vessel for containing the melt and a refining device including a solid electrolyte ionic conductor having the impurity as the ionically conductive species and into which a refining gas having an impurity concentration different from that of the melt is introduced in order to cause transport of the impurity through the solid electrolyte ionic conductor and result in removal of the impurity from the melt as an impurity gas to produce a refined melt.

In other embodiments and aspects of the invention, a method is provided for batch and continuous electrochemical refining of a melt. The batch refining process includes the steps of providing a melt including an impurity at a particular concentration, immersing a refining device in the melt including a solid electrolyte ionic conductor which allows pumping of the impurity out of the melt to produce a refined melt, removing the refined melt, once again providing an impurity-containing melt and repeatedly cycling through the several steps of the process.

In the continuous refining process, an impurity-containing melt continuously flows through the inside of a melt refining chamber having solid electrolyte ionic conductor chamber walls which are coated with at least one short-circuited electrode. A refining gas having a concentration of the impurity selected so that the impurity is removed from the melt across the solid electrolyte ionic conductor chamber walls continuously flows outside the chamber walls. The flows of the melt and the refining gas are S preferably in opposite directions. Refined melt is continuously collected at a melt outlet of the melt refining chamber.

It is an object of this invention to provide methods and apparatus for energy efficient, environmentally benign electrochemical refining of melts which are relatively inexpensive, avoid the formation of impurity element compounds which can remain in the melt as inclusions if further processing steps are not carried out and are sufficiently rapid to be commercially viable. A further object of the invention is provision of methods for continuous or batch electrochemical refining of a melt which offer the same advantages previously described for the electrochemical melt refining process of the invention, and, additionally, can be continuously performed as is highly desirable for commercial metal refining.

Other and further objects, features and advantages of the present invention will be readily apparent to those skilled in the art in reading the description of the preferred embodiments which follows:

BRIEF DESCRIPTION OF THE DRAWINGS

FIG. 1 is a schematic illustration of a slow oxygen removal process controlled by electronic transport.

FIG. 2 is a schematic illustration of a rapid oxygen removal process which is not controlled by electronic transport.

FIG. 3 is a cross section schematic illustration of a refining device having minimal external resistance.

FIG. 4 is a schematic illustration of an apparatus for electrochemically refining a melt according to the invention.

FIG. 9 is a graph showing actual and theoretical plots of melt oxygen content (ppm) as a function of time (min) corresponding to the data shown in FIG. 8.

FIG. 14 is a graph showing sheet resistance (ohm/square) as a function of time (hr) which indicates the variation in sheet resistance of the electrodes as a function of aging time, FIG. 15 is an optical micrograph showing the morphology of a cermet electrode before annealing or aging.

FIG. 16 is an optical micrograph showing the morphology of a cermet electrode after a 100 hour anneal at 1373K.

FIG. 17 is a schematic illustration of a continuous electrochemical refining method for a metal melt according to the invention.

DETAILED DESCRIPTION OF THE INVENTION

Figure 5:
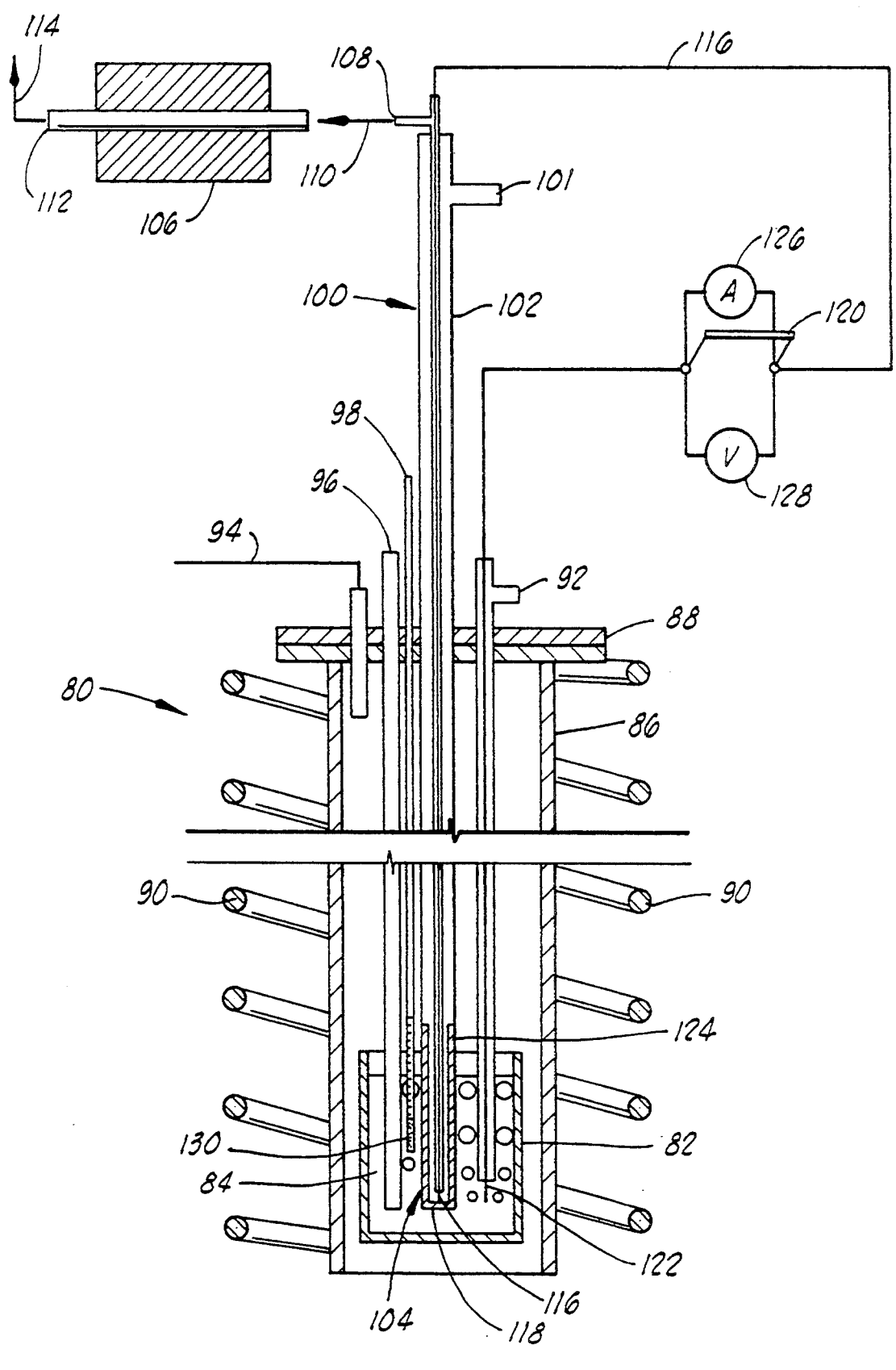
FIG. 5 is a schematic illustration of an apparatus for electrochemical refining of a copper melt according to EXAMPLE 3.

The invention provides a method for electrochemically refining an impurity-containing melt including exposing a refining device to the melt and using a solid electrolyte ionic conductor in the refining device to pump the impurity from the melt and exhaust it as a gas to the air. A batch method for electrochemical refining of a melt wherein the refined melt is removed from the refining apparatus and the refining steps cyclically repeated is also provided as is a continuous refining method wherein an impurity-containing melt to be refined and a refining gas are continuously flowed past the solid electrolyte ionic conductor walls of a refining chamber. An apparatus for electrochemical refining of the melt, including a vessel for containing the melt and a refining device including a solid electrolyte ionic conductor which serves as a pump to transport the impurity from the melt and exhaust it as a gas to the air is also provided.

The melt can be a metal melt such as copper, silver, iron, low carbon iron, nickel, cobalt, silicon, germanium and alloys of the foregoing metals. The electrochemical refining technique of the invention can be used to refine metal melts characterized by a first impurity concentration which very broadly varies from about 1000 ppm to about 1 ppm and typically is in the range of from about 400 ppm to about 5 ppm. The first impurity concentration encountered in practice of the invention will vary depending on the exact chemical nature of the impurity as well as on the chemical nature of the metal element or metal alloy melt from which the impurity is to be extracted.

The electrochemical refining method of the invention is very flexible and by tailoring parameters such as the composition and thickness of the solid electrolyte ionic conductor, the operation temperature of the refining device, the second impurity concentration of the refining gas and the flow rate of the refining gas, it is possible to apply the method to a wide variety of elemental and metal alloy melts characterized by the presence of impurities including oxygen, sulfur and hydrogen, present at varying first impurity concentration levels.

The invention is also suitable for the electrochemical recovery of metals from slag or other melts containing compounds of the metals. The melt can be a metal oxide or slag melt containing oxides of copper, silver, iron, nickel, cobalt, lead, silicon or germanium or an oxide melt such as $PbO\text{-}SiO_2$. The concentration of the metallic component in such a slag or oxide melt is in the range of from about 0.1% by weight of the compound to about 99.9% by weight of the compound and preferably is in the range of from about 50% by weight of the compound to about 99.9% by weight of the compound.

The impurity can be an impurity such as oxygen, hydrogen or sulfur and it is possible to simultaneously remove more than one impurity. For example, in a deoxidation process, sulfur can be simultaneously removed according to the reaction $S(\text{metal}) + \frac{1}{2} O_2(g) = \frac{1}{2} S_2 + O(\text{metal})$.

The solid electrolyte conductor is selected so that its ionically conductive species is the same ion as the impurity which is to be electrochemically removed from the melt.

Solid electrolyte ionic conductors can be oxygen, hydrogen, sulfur or other elemental ion conducting solid electrolyte ionic conductors depending upon the impurity to be removed. Solid electrolyte ionic conductors are characterized by a parameter known as the electronic transport number which indicates what fraction of the total conductivity measured for the solid electrolyte ionic conductor is due to transport of electrons as distinguished from transport of ions. Solid electrolyte ionic conductors best suited for use in the refining device of the invention, are characterized by negligible electronic transport numbers (not greater than about 0.1), thus indicating that most of their measured conductivity results from transport of ions through the solid electrolyte.

It is also desirable for the solid electrolyte ionic conductors to have ionic conductivities which allow for an acceptably rapid rate of impurity removal from the impurity-containing melt. The actual value of the solid electrolyte ionic conductivity will vary depending upon factors including the nature of the ionic species responsible for the ionic conduction, the nature of the solid electrolyte ionic conductor and the temperature at which the solid electrolyte ionic conductor is operated. If large quantities of impurities must be removed, a solid electrolyte ionic conductor having as its ionically conductive species the impurity to be removed from the melt must have a relatively high ionic conductivity at the temperature at which the refining process is to be performed. Suitable solid electrolyte ionic conductors have ionic conductivities greater than about $0.001(\text{cm})^{-1}$ at operating temperatures greater than about 300° C.

Yttria-stabilized zirconia solid electrolyte can be used as an oxygen ion ionic conductor in an electrochemical refining process where oxygen is the impurity being removed from the melt. In electrochemical refining processes where sulfur is the impurity being removed from the melt, sulfur ion conducting solid electrolytes can be used such as yttria-stabilized zirconia doped with 10–30% CaS or pure CaS. In electrochemical refining processes where hydrogen is the impurity being removed from the melt, hydrogen ion conducting solid electrolytes such as $SrCeO_3$ can be used.

In order to maximize transport of the impurity through the solid electrolyte ionic conductor, it is desirable to fabricate the solid electrolyte ionic conductor to have a minimum thickness which still displays appropriate mechanical properties to withstand the melt environment and retain mechanical integrity. Typical solid electrolyte ionic conductor thicknesses are not greater than about 5 mm.

The solid electrolyte ionic conductor separates the melt from the refining gas and is characterized by a melt-facing surface which is in contact with the melt and by a refining gas-facing surface which is in contact with the refining gas. "Porous cermet electrodes" which is used herein to refer to cermet electrodes having a porosity in the range of from about 10% to about 60% are deposited on the melt-facing surface and/or on the refining gas-facing surface of the solid electrolyte ionic conductor. The chemical composition of the porous cermet is selected according to the particular melt chemistry, solid electrolyte composition, and the temperature at which the refining process is to be conducted so that the porous cermet electrodes maintain their porosity, adhere well to the solid electrolyte; and remain chemically stable during the electrochemical refining process. Porous cermet electrodes used with oxygen ion conducting yttria-stabilized zirconia electrolytes can include $Mo\text{-}ZrO_2$, $Co\text{-}ZrO_2$, $Ni\text{-}ZrO_2$ and $Ru\text{-}ZrO_2$; cermets. Temperatures for electrochemical refining of iron are in the range of from about 1550° C. to about 1650° C., for copper in the range of from about 1050° C. to about 1150° C. and for $PbO\text{-}SiO_2$ in the range of from about 950° C. to about 1050° C. The $Mo\text{-}ZrO_2$ cermets can be useful for refining processes involving ferrous melts. The $Co\text{-}ZrO_2$ and $Ni\text{-}ZrO_2$ cermets are useful for refining processes for copper melts and $Ru\text{-}ZrO_2$ cermets are needed to withstand the high temperatures, in the range of from about 1600° C. to about 2000° C., typically encountered in steelmaking applications.

The electrodes applied to the solid electrolyte ionic conductor can be short-circuited to make the refining process of the invention sufficiently rapid for commercial practicality. For metal melts, a single electrode on the refining gas-facing surface can be short-circuited to the melt or two electrodes can be provided and short-circuited to each other. For metal oxide melts, two electrodes are short-circuited together. Short-circuiting of the electrodes overcomes the limitation of an electronic transport rate-controlled process.

The $Mo\text{-}ZrO_2$; cermet electrodes can be used for refining several types of melts including low carbon iron, copper and $PbO\text{-}SiO_2$. However, $Ni\text{-}ZrO_2$ cermet electrodes can only be used for refining $PbO\text{-}SiO_2$ and copper melts because of the low melting point of the Ni metal constituent. All these electrode materials sinter easily to the yttria-stabilized zirconia solid electrolyte ionic conductor and are capable of maintaining a porous electrode structure throughout the refining process.

Typical electrode thicknesses are in the range of from about 2000 $\mu$m to about 20 $\mu$m, typical porosities are in the range of from about 10% to about 60% and typical sheet resistances are in the range of from about 0.02Ω/square to about 0.2Ω/square for electrodes having a thickness of about 150 μm.

The zirconia-based cermet electrodes are deposited on a solid electrolyte ionic conductor surface by coating the surface with a slurry containing $ZrO_2$ and the metal particles or metal oxide particles, which can later be reduced, along with appropriate binders, dispersants and plasticizers to produce a slurry having the appropriate consistency. Control of the slurry composition along with the particle size results in an optimum electrode structure consisting of metal particles providing a continuous electrical path in the porous electrode layer along with small $ZrO_2$ particles as a discontinuous phase to aid in keeping the electrode structure intact. Other important electrode properties for efficient operation of the refining device are that the electrodes adhere well to the solid electrolyte ionic conductor and have compatible thermal expansion coefficients so that they do not delaminate under thermal cycling during refining device operation. Also, electrodes must have low sheet resistance.

As shown schematically in FIG. 1, solid electrolyte ionic conductor 10 is placed in contact with reducing gas 12 at surface 13 and in contact with melt 14 at surface 15 so that reducing gas 12 does not come into direct contact with melt 14. By maintaining a lower activity of an impurity, such as oxygen, on the reducing gas 12 side of solid electrolyte ionic conductor 10, by comparison with the impurity, such as oxygen, activity level in melt 14, impurity ions can be made to migrate through solid electrolyte ionic conductor 10 as shown by arrow 16 and into reducing gas 12. The migration of oxygen ions as shown by arrow 16 must be compensated by an equal flux of electrons moving in the opposite direction, i.e., from reducing gas 12 to melt 14 as indicated by arrow 18. However, since solid electrolyte ionic conductors such as the oxygen ion conductor, yttria-stabilized $ZrO_2$, are known to have very low electronic conductivity, it is clear from the schematic configuration shown in FIG. 1 that the electron migration indicated by arrow 18 will, in fact, control the rate of oxygen extraction from melt 14.

The rate of oxygen extraction can be increased by providing a faster route for electronic transport as shown schematically in FIG. 2 wherein porous electrodes 20, such as a porous $ZrO_2$ based cermet electrodes, are deposited on surfaces 13 and 15 of solid electrolyte ionic conductor 10. As also shown schematically in FIG. 2, porous electrodes 20 are connected, i.e., short-circuited, thereby providing a path for rapid electronic transport as indicated by arrow 18 and, hence, for rapid oxygen ionic transport indicated by arrow 16. It is also noted that when melt 14 is metallic, it is possible to short-circuit a single electrode with the melt. When the melt is non-metallic, the two electrodes can be directly connected to produce a short-circuit as shown schematically in FIG. 2.

The solid electrolyte ionic conductor and electrode constituents of the refining device can be configured as shown schematically in FIG. 3 in order to decrease the external resistance associated with the short-circuiting process. In FIG. 3, $ZrO_2$ tube 30 closed at one end has a porous cermet electrode 32 coated entirely on $ZrO_2$ inner surface 34 and in contact with reducing gas 36. Dense cermet 38 is deposited at closed end 40 of $ZrO_2$ tube 30 and is in contact with porous cermet electrode 32 for the required short-circuiting as well as with melt entry hole 42 which allows melt 44 to contact dense cermet electrode 38. Typically, porous cermet electrode 32 is characterized by a porosity in the range of from about 10% to about 60%, while dense cermet electrode 38 is characterized by a porosity in the range of from about 5% to about 0% and can be a cermet such as $Ni-ZrO_2$ or $Mo-ZrO_2$.

A refining gas is introduced into the refining device and can be a reducing gas such as an $H_2/Ar/H_2O$ gas mixture, an $Ar/CO/CO_2$ gas mixture or a $CH_4$-containing gas mixture. The chemical composition of the gas mixture is adjusted to produce a very low impurity partial pressure (potential) which is typically in the range of from about $10^{-2}$ atm to about $10^{-40}$ arm, and more preferably in the range of from about $10^{-12}$ atm to about $10^{-30}$ arm to create a sufficient chemical potential gradient and driving force for transport of the impurity i.e., removal of the impurity from the melt. No constituents of the refining gas such as H or C are incorporated into the melt.

The reducing gas flow rate is also adjusted to optimize the transport of the impurity from the melt through the solid electrolyte ionic conductor. For example, for a given electrolyte thickness, it is possible to obtain a higher oxygen ion flux through a solid electrolyte ionic conductor by increasing the flow rate of the reducing gas since, by so doing, the impurity activity, such as the oxygen activity, at the reducing gas/electrolyte interface will be decreased. Typical reducing gas flow rates are in the range of from about 5 cc/min-cm$^2$ of electrolyte to about 200 cc/min-cm$^2$ of electrolyte depending on the desired rate of impurity removal. If the impurity concentration gradient in the reducing gas phase is rate controlling, rather than impurity flux through the electrolyte as has been previously assumed, then the reducing gas flow rate can be increased, or the reducing gas side of the electrolyte can be continuously evacuated using a vacuum pump.

In refining particular molten metals where the impurity concentration gradient in the melt is rate-controlling, rather than the impurity flux through the electrolyte as has been assumed in the preceding discussion, the refining device can be moved around in the melt or the melt can be mildly agitated, such as by introducing an inert gas such as argon, nitrogen or a combination thereof, which also serves to provide an inert atmosphere for atmosphere sensitive-melts. Similarly, the melt can be stirred using induction stirring methods well known to one skilled in the art. An external electromotive force can be applied to decrease reducing gas consumption or otherwise enhance refining kinetics. However, it is also noted that such stirring does not introduce any violent stirring reactions and, therefore, provides a relatively quiescent refining operation which results in minimal refractory wear.

Also, in the refining of slags, the refining device can be moved around in the melt to overcome any localized rate-controlling impurity concentration gradients in the molten slag.

According to the electrochemical refining method of the invention, the impurities in the melt are reduced from ions, such as oxygen, hydrogen or sulfur ions, to form an exhaust gas, such as oxygen, hydrogen or sulfur gas, which is evolved into the atmosphere from the refining device without producing any impurity inclusions in the refined molten metal which typically has a third impurity concentration in the range of from about 1 ppm to 1000 ppm without consumption of any alloying elements during the refining process. The exhaust gas can be recycled to heat the melt directly or can be used in a combustion process to heat the melt.

As stated earlier, the electrochemical refining process of the invention does not generate any environmentally harmful by-products in the form of gases or slags and since it operates as a galvanic, current producing, cell and not as an electrolysis, current consuming cell, (i.e., no external electromotive force is applied), the method is highly energy efficient and extremely environmentally benign.

An apparatus for electrochemical refining of the melt is shown schematically in FIG. 4. In FIG. 4, melt 50 is contained within crucible 52. Refining device 54 is immersed in melt 50. Refining device 54 includes refractory tube 56 which can be constructed from any refractory material such as alumina, fitted with upper electrode 58 and lower electrode assembly 60 composed of porous cermet electrodes 62 and 63 which can be Mo-$ZrO_2$ separated by solid electrolyte ionic conductor 64 which can be yttria-stabilized $ZrO_2$. Upper electrode 58 and porous cermet electrode 63 are electrically connected in a short circuit as shown by circuit diagram 66 so that refining device 54 operates as a galvanic cell.

Impurities are removed from melt 50, transported through solid electrolyte ionic conductor 64 and reduced in refining device 54 so that they are converted to a gaseous form, such as gaseous oxygen, if the impurity in melt 50 is oxygen, as shown by arrows 68 and exhausted from refining device 54 through exhaust gas outlet 70. Refining device 54 contains refining gas 72 which can be a reducing gas, and is introduced into refining device 54 through refining gas inlet 74 and is separated from melt 50 by solid electrolyte ionic conductor 64.

The apparatus shown schematically in FIG. 4 can be used for a batch electrochemical refining process if melt 50 is removed once it has been refined and another, impurity-containing melt is introduced.

EXAMPLE 1

The following EXAMPLE is provided to show how a low carbon iron melt can be refined according to the method of the invention.

A low carbon iron melt with 300 ppm of dissolved oxygen can be refined at 1600° C. to an oxygen level of 25 ppm using a 2 mm thick electrolyte. The equilibrium oxygen pressure (P'$O_2$) of the melt during the refining operation will vary from $1.3 \times 10^{-10}$ atm at the beginning (when dissolved oxygen is 300 ppm) to $10^{-2}$ arm at the end (when dissolved oxygen is 25 ppm). If the oxygen potential of the reducing gas (P"$O_2$) is maintained at $10^{-12}$ arm (e.g., by maintaining an $H_2/H_2O$ ratio of 100) during the entire refining operation, then the average oxygen ion flux through the electrolyte would be $8.4 \times 10^{-5}$ gm/cm$^2$-sec.

Based on this average flux calculation, this refining operation can be performed in the laboratory on a 5 kg low carbon iron melt using 10 cm$^2$ of the electrolyte surface in contact with the melt in 27 minutes. If dry $H_2$ is used for this refining operation, the flow rate required would be about 7 liters/minute (which would maintain an $H_2/H_2O$ ratio of 100 over 10 cm$^2$ surface of the electrolyte.) Such a flow rate of $H_2$ can be easily maintained in laboratory experiments and can also be scaled up for pilot plant operation. Based on the electrochemical nature of the refining process, it is also possible to perform the same refining operation with a lower flow rate of $H_2$ if an external EMF is applied in the direction of the current flow of this galvanic cell.

EXAMPLE 2

The following EXAMPLE is provided to show how a PbO-$SiO_2$ melt system can be refined according to the method of the invention.

A PbO-$SiO_2$ melt system can be reduced at 1000° C. from $X_{Pbo}{}^1 = 0.6$ to $X_{Pbo} = 0.4$, the equilibrium oxygen pressure in the melt (P'$O_2$) will vary from $1.9 \times 10^{-9}$ atm at the beginning (when $X_{Pbo} = 0.6$) to $2.2 \times 10^{-10}$ atm at the end (when $X_{Pbo} = 0.4$). At 1000° C., it is possible to maintain an oxygen potential (P"$O_2$) of $10^{-19}$ atm on the gas side of the electrolyte by maintaining an

[1] $X_{Pbo}$ is the mole fraction of PbO in a PbO-$SiO_2$ melt.

$H_2/H_2O$ ratio of 100. Under these refining conditions, the average oxygen ion flux through a 2 mm thick electrolyte would be $5.4 \times 10^{-5}$ gm/cm$^2$-sec. This would correspond to an average lead recovery of $7 \times 10^{-4}$ gm/cm$^2$-sec. The flow rate of dry $H_2$ required for this refining operation would be approximately 0.5 liters/minute per cm$^2$ of the electrolyte surface. (This will maintain an $H_2/H_2O$ ratio of 100 over the electrolyte surface). The above calculated lead recovery rate is an order of magnitude greater than achieved by prior art methods.

Furthermore, since the flux of oxygen ions through the electrolyte is inversely proportional to its thickness, the above calculated refining fluxes can be increased further by decreasing the electrolyte thickness. Also, for a given electrolyte and electrolyte thickness, we can obtain a higher oxygen ion flux through the electrolyte if we use a higher flow rate of $H_2$ gas because, by doing so, the $H_2/H_2O$ ratio in the reducing gas will increase, i.e., P"$O_2$ at the gas/electrolyte interface will decrease. The same effect can also be obtained by applying an external EMF in the direction of the current flow.

EXAMPLE 3

The following EXAMPLE is provided to show how copper melts having low oxygen concentrations as well as copper melts having high oxygen concentrations are deoxidized using the electrochemical refining method of the invention.

The oxygen-containing copper melts were deoxidized using deoxidizing apparatus 80 shown schematically, in cross section, in FIG. 5. Alumina crucible 82 having a 3.65 cm internal diameter, 9.15 cm height and 2 mm thickness, was filled with copper melt charges 84 weighing between about 300–500 g and placed inside sealed alumina furnace tube 86. The furnace tube is sealed using water cooled copper plate 88 and heated to 1373 K. using silicon carbide resistance heating furnace elements 90. A positive pressure (2–5 psi) of an inert atmosphere such as argon is provided through argon inlet 92 at the top of water cooled copper plate 88. Water cooled copper plate 88 is also provided with argon outlet 94, thermocouple conduit 96, oxygen probe 98 and refining device 100.

Refining device 100 consists of alumina tube 102 which is cemented to refining assembly 104 using cements such as X-9 TM, a high alumina phosphate bonded plaster refractory plaster from Crucible Refractory Company, and AUTOSTIC TM, a silicate clay with metallic ions including Mg, Al, Fe, Ca (SiO$_4$) from Carlton, Brown and Partners Ltd., to prevent gas leaks. Refining assembly 104 includes an oxygen ion conductor solid electrolyte coated with an electrode on the side facing the melt 84. A reducing gas is separated from melt 84 by the solid electrolyte. Oxygen ions are transported from melt 84 by the solid electrolyte. Oxygen ions are transported from melt 84 through the solid electrolyte, reduced to form oxygen gas and exhausted.

Alumina tube 102 extends out to the top of water cooled copper plate 88. To perform a deoxidation process, refining device assembly 104 is dipped into the copper melt 84 and flushed with a reducing gas (120 cc/min hydrogen) introduced through reducing gas inlet 101 and flowed through alumina tube 102. Gas exiting alumina tube 102 passes through oxygen sensor 106 from exhaust port 108 with the direction of flow being indicated by arrow 110 in order to determine the oxygen potential of the reducing gas and is exhausted from oxygen sensor 106 through oxygen sensor exhaust port 112 as indicated by arrow 114.

Chromel or stainless steel wire 116 is sintered to nickel-zirconia cermet electrode 118, extends out of alumina tube 102 and is connected to one terminal of bipolar switch 120 which is connected to chromel or stainless steel wire 122 which dips into the copper melt 84 through argon inlet tube 92 which bubbles argon at the rate of 50 cc/min into copper melt 84 to keep the environment of alumina furnace tube 86 inert and to stir copper melt 84.

Bipolar switch 120 can be operated under a short circuit mode or an open circuit mode. When the switch is operated under a short-circuit mode, oxygen is extracted from copper melt 84 through $ZrO_2$ solid electrolyte ionic conductor 124 and the current flowing through the circuit is measured using ammeter 126. From the Faradaic equivalent of the current measured by ammeter 126, the amount of oxygen extracted from copper melt 84 is estimated. When bipolar switch 120 is operated in open circuit mode, the open circuit voltage is measured using voltmeter 128. The equilibrium open circuit voltage measured by voltmeter 128 indicates the amount of oxygen present in copper melt 84 at a given instant during the refining process. By monitoring the rate of change in the open circuit voltage measured by voltmeter 128 when bipolar switch 120 is flipped from short-circuit mode to open-circuit mode, the degree of polarization and the mass transfer coefficient of oxygen in copper melt 84 can be measured. Oxygen probe 130 consisting of yttria-stabilized $ZrO_2$ electrolyte and a Ni/NiO reference electrode is also used to monitor the initial and final oxygen level in copper melt 84.

Short circuit refining (deoxidation) experiments using Cu melts were conducted starting from both high and low oxygen concentrations. For both these types of experiments, the refining device was immersed in the copper melt at 1373K in the open circuit mode. No deoxidation of the melt was observed as a result of the argon bubbling. Furthermore, no measurable thermal EMF was generated in the device. The Open circuit voltage of the device was measured with hydrogen and water vapor serving as the reference gas inside the (zirconia tube) device.

By measuring the oxygen potential of the exiting mixture of hydrogen and water vapor, using oxygen sensor 106 operated at 1000 K., the oxygen potential in the reference gas mixture passing through the device at 1373 K., was estimated assuming that the reaction $H_2(g) + \frac{1}{2}O_2(g) = H_2O(g)$ is always at equilibrium. Incorporating this oxygen potential of the reference gas in the Nernst equation for the open circuit voltage of the device, the oxygen potential in the copper melt was calculated ($P_O$ in the copper melt =

-continued $$\text{EXP}\left(\frac{4FE}{RT}\right) \times P_{O2} \text{ in the reference gas}).$$

The value of the estimated oxygen potential in the copper melt was usually rechecked using oxygen probe 130. The EMF reading (E) of the oxygen probe is related to the oxygen potential (partial pressure) of the copper melt according to the following relation:

$$E_{Copper\ Probe} = \frac{1}{2F}(-\Delta G^0_{Ni/NiO} + RT \ln P^{\frac{1}{2}}_{O2} \text{ in Cu})$$

where $\Delta G^0_{Ni/NiO}$ is the standard free energy of formation of NiO. (It is noted that the estimated oxygen potential ($PO_2$) in copper melt 84 obtained using the refining device was on the same order as that measured using the oxygen probe).

Once the initial oxygen potential in copper melt 84 was ascertained, the amount of oxygen in solution in copper melt 84 was determined using the equilibrium constant for the reaction $\frac{1}{2}O_2(g) = \underline{O}$ in Cu($K_{eq}$ = (%O)/($PO_2$)$^{\frac{1}{2}}$).

After determining the oxygen in solution in copper melt 84, appropriate amounts of copper oxide were added to the melt in order to adjust the oxygen level to the desired value before starting the deoxidation experiment. Before beginning the deoxidation experiment, hydrogen gas was passed through refining device 100 and the open circuit voltage was measured. The open circuit voltage was allowed to stabilize to insure that melt 84 was homogenized with respect to the dissolved oxygen. A stable value of the open circuit voltage also indicated that the intrinsic electronic conductivity of the electrolyte in the refining device did not deoxidize the melt. (It is noted that during some experiments, a reasonably stable open circuit voltage was not obtained which indicated that there was a leak in refining device 100.)

Figure 6:
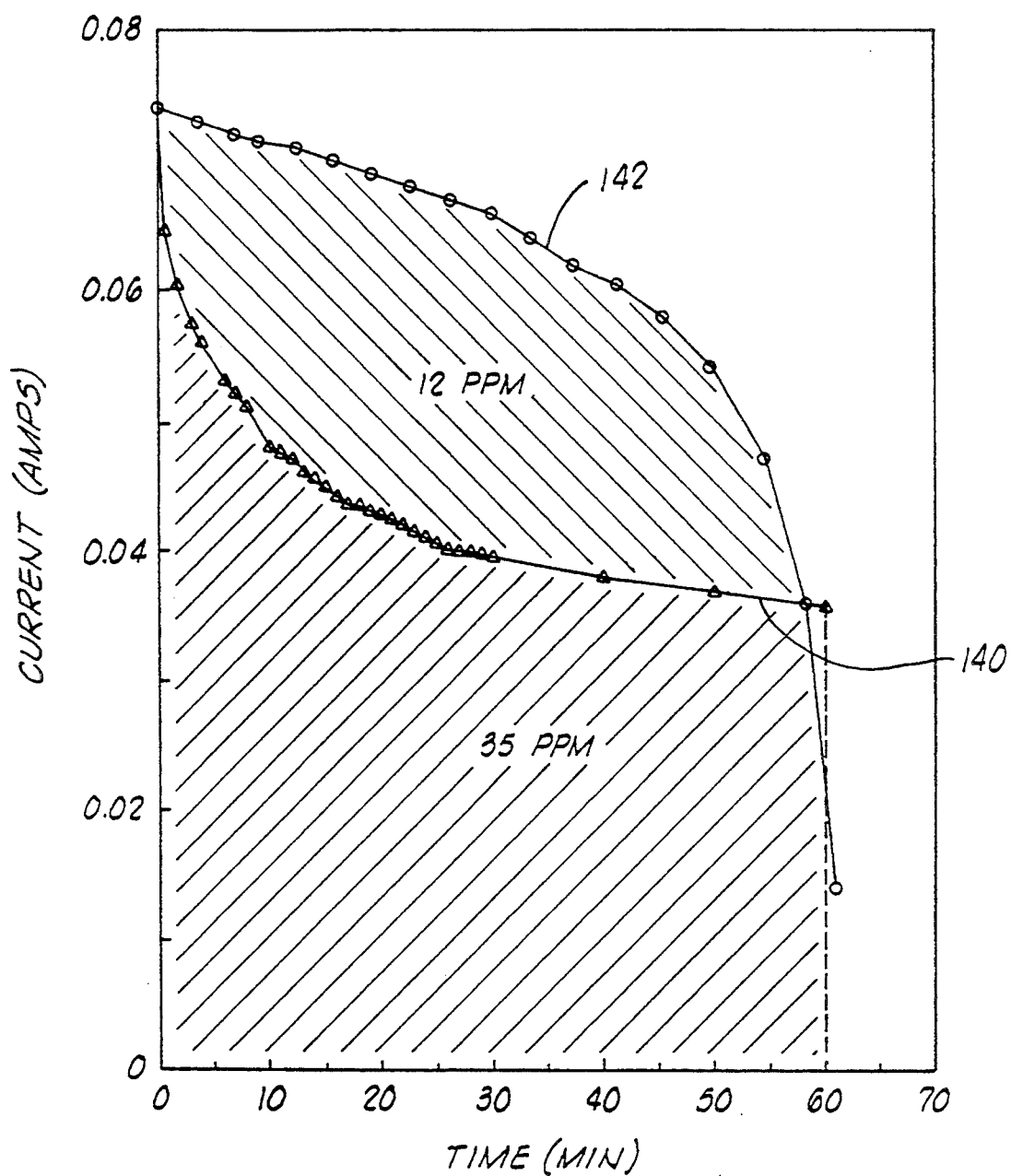
FIG. 6 is a graph showing actual and theoretical short-circuit current (amps) as a function of time (min) assuming rate-controlling transport through the electrolyte.

The short circuit current (amps) of the refining device as a function of time (min) for a typical experiment is shown in FIG. 6. The short circuit current is an indicator that oxygen is being removed from the melt. In this experiment, the starting oxygen level as measured by oxygen probe 130 and refining device 100 was around 47 ppm. The amount of the copper melt was 400 g and the interfacial area (for charge transfer) between solid electrolyte ionic conductor 124 and melt 84 was 24.6 cm$^2$. The stable open circuit voltage of the refining device 100 before beginning the short circuit deoxidation process was 0.446 V and the current when refining device 100 was first short-circuited was 74 mA. This corresponded to an external resistance (including the contact resistance), associated with the wires involved in the short-circuit, of around 6 ohms; the resistance associated with the electrolyte 124 was around 0.1 ohms. Based on all these data, the theoretical short-circuit current versus time, assuming transport through the electrolyte to be rate controlling, is also shown in FIG. 6. By measuring the area under the short-circuit current versus time plot we can determine the amount of oxygen extracted.

From FIG. 6, it is clear that the actual deoxidation process that occurred in the experiments shown by experimental curve 140 is slower than that predicted by theoretical plot 142. In fact, by measuring the area under the two plots, it is seen that in 60 minutes about 35 ppm of oxygen are actually removed, although according to the theoretical plot, the entire oxygen content should have been removed if transport through electrolyte 124 were the slowest step. From these results, it appears that the oxygen transport in copper melt 84 is slower than transport through electrolyte 124, since the gas phase transfer on the hydrogen side is expected to be faster than the transport through copper melt 84. From the foregoing arguments, it is, therefore, conceivable that by increasing gas stirring in the melt or by using induction stirring, one could enhance the deoxidation kinetics. The device produces a steady short-circuit current even at low oxygen levels in the melt making it possible to lower the oxygen content in copper melt 84 to less than 1 ppm (not shown in FIG. 6) by continuing the short circuit process for an additional 60 minutes.

Figure 7:
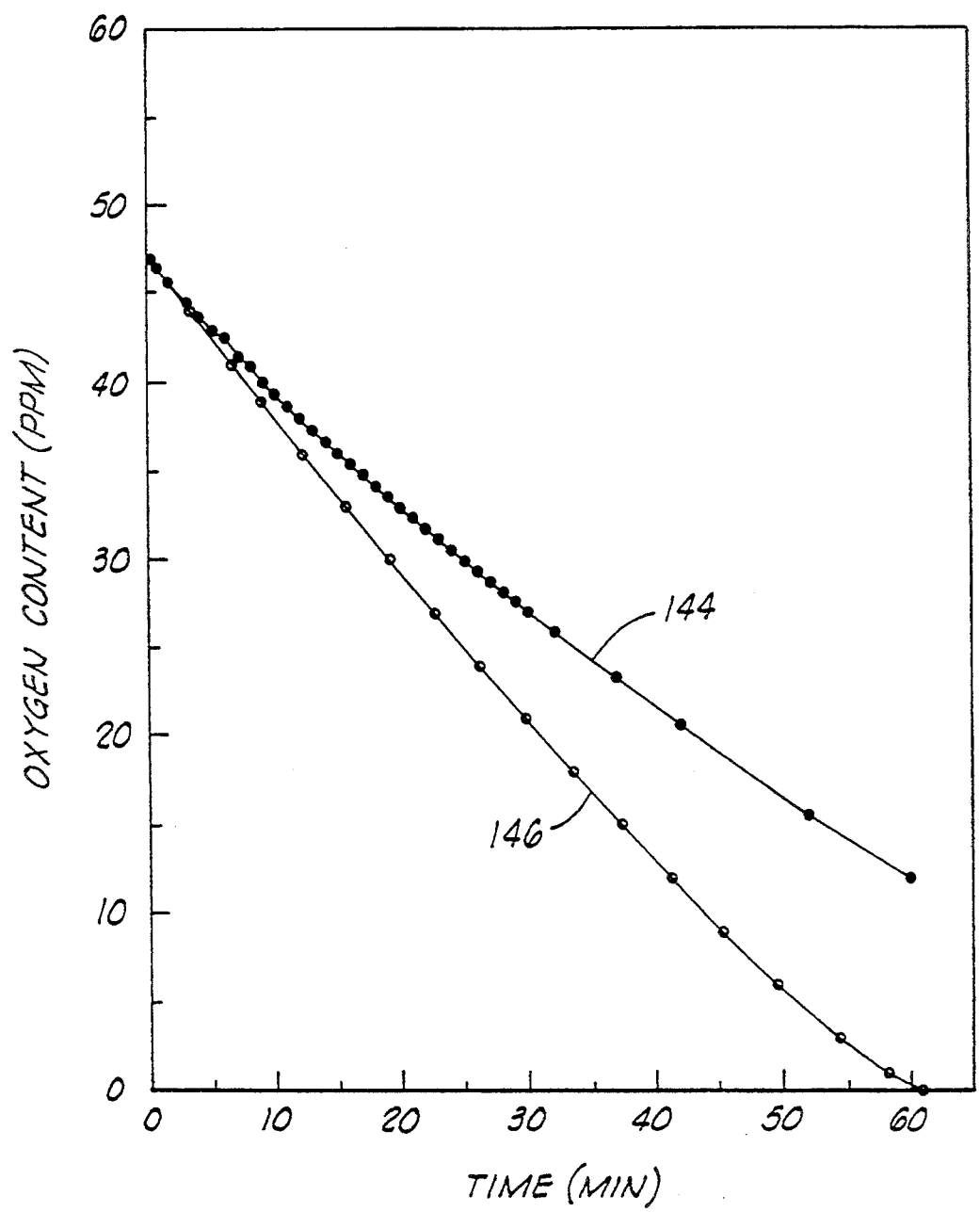
FIG. 7 is a graph showing actual and theoretical plots of melt oxygen content (ppm) as a function of time (min) corresponding to the data shown in FIG. 6.

FIG. 7 plots the actual variation of oxygen in melt 84 (curve 144) along with the theoretically predicted variation (curve 146) as a function of the short-circuit refining time and is based on the current versus time behavior reported in FIG. 6. (It is noted that the final oxygen content measured using the oxygen probe at the end of 60 minutes of refining (0.0013% by weight) agreed well with the final oxygen content calculated using the current versus time plot. This observation also suggests that refining device 100 was relatively leak tight.)

Figure 8:
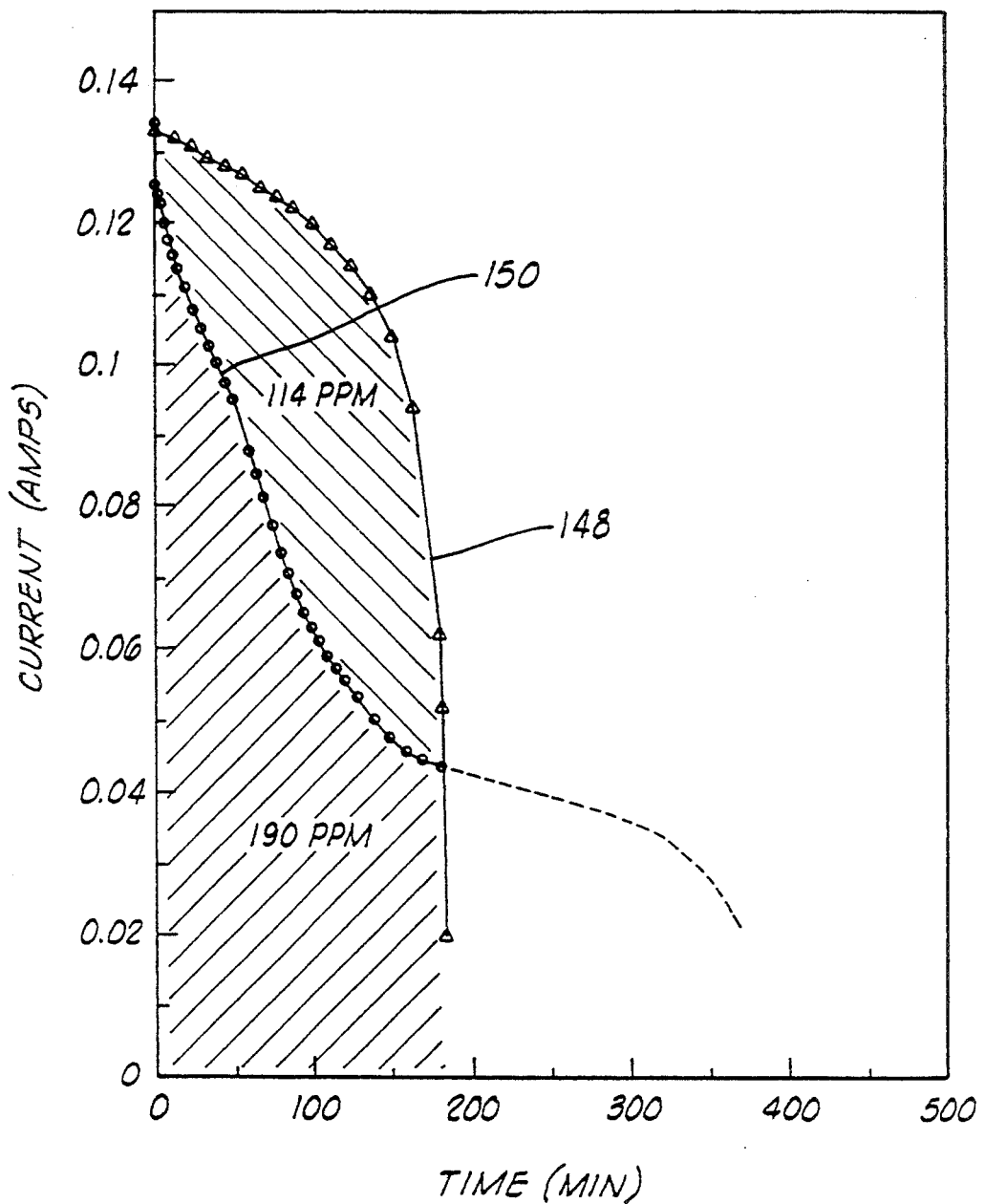
FIG. 8 is a graph showing actual and theoretical short-circuit current (amps) as a function of time (min), assuming rate-controlling transport through the electrolyte.

The short circuit current of refining device 100 as a function of time for a typical experiment in the high oxygen concentration regime is shown in FIG. 8. In this experiment, the starting oxygen level in the melt as measured by the refining device 100 and oxygen probe 130 was about 304 ppm. The weight of copper melt 84 was about 350 g and the interfacial area between solid electrolyte conductor 124 and melt 84 (for charge transfer) was about 21.7 cm². The stable open circuit voltage of the refining device before beginning the short circuit deoxidation process was about 0.569 V and the current when the device was first short-circuited was about 134 mA. This corresponded to an external resistance, associated with wire 116 involved in the short circuit, of around 4.2 ohms. A significant portion of this external resistance is due to contact resistance. Based on all these data, the theoretical short-circuit current versus time, assuming transport through the electrolyte is rate-controlling, is shown by curve 148 in FIG. 8. The amount of oxygen that is extracted during this short-circuit deoxidation process can be calculated by measuring the area under the experimental current versus time plot. From FIG. 8 experimental curve 150, it is clear that in 180 minutes, about 190 ppm of oxygen was actually removed by short circuiting. However, if the transport through the electrolyte were rate-controlling, then the entire oxygen content should have been removed by this time. Hence, it is apparent that the oxygen transport in copper melt 84 was rate-controlling and the actual deoxidation rate can be enhanced by increasing melt stirring. It is noted that refining device 100 is capable of removing oxygen to less than 1 ppm in about 360 minutes if the short-circuit is maintained.

FIG. 9 plots the experimentally observed variation of oxygen content in the melt, curve 152, along with the theoretically predicted variation of oxygen content in the melt as a function of the short-circuit refining time, curve 154. These plots are based on the current versus time behavior reported in FIG. 8.

EXAMPLE 4

EXAMPLE 4 is provided to illustrate how the porous cermet electrodes used in the refining device of the invention are prepared.

A porous Ni-$ZrO_2$ cermet was deposited over the inner walls of a closed end zirconia tube which had an external diameter of 9.5 mm and was 1.6 mm thick. Some deposition experiments were also conducted wherein the cermet was deposited over the outer walls of the tube. The cermet was between about 30 to about 150 microns thick, about 34% porous, contained approximately 75 wt.% Ni and had a room temperature sheet resistance between 0.0064 and 0.19 ohms per square. The flow chart for depositing the cermet electrode is shown in FIG. 10.

Figure 10:
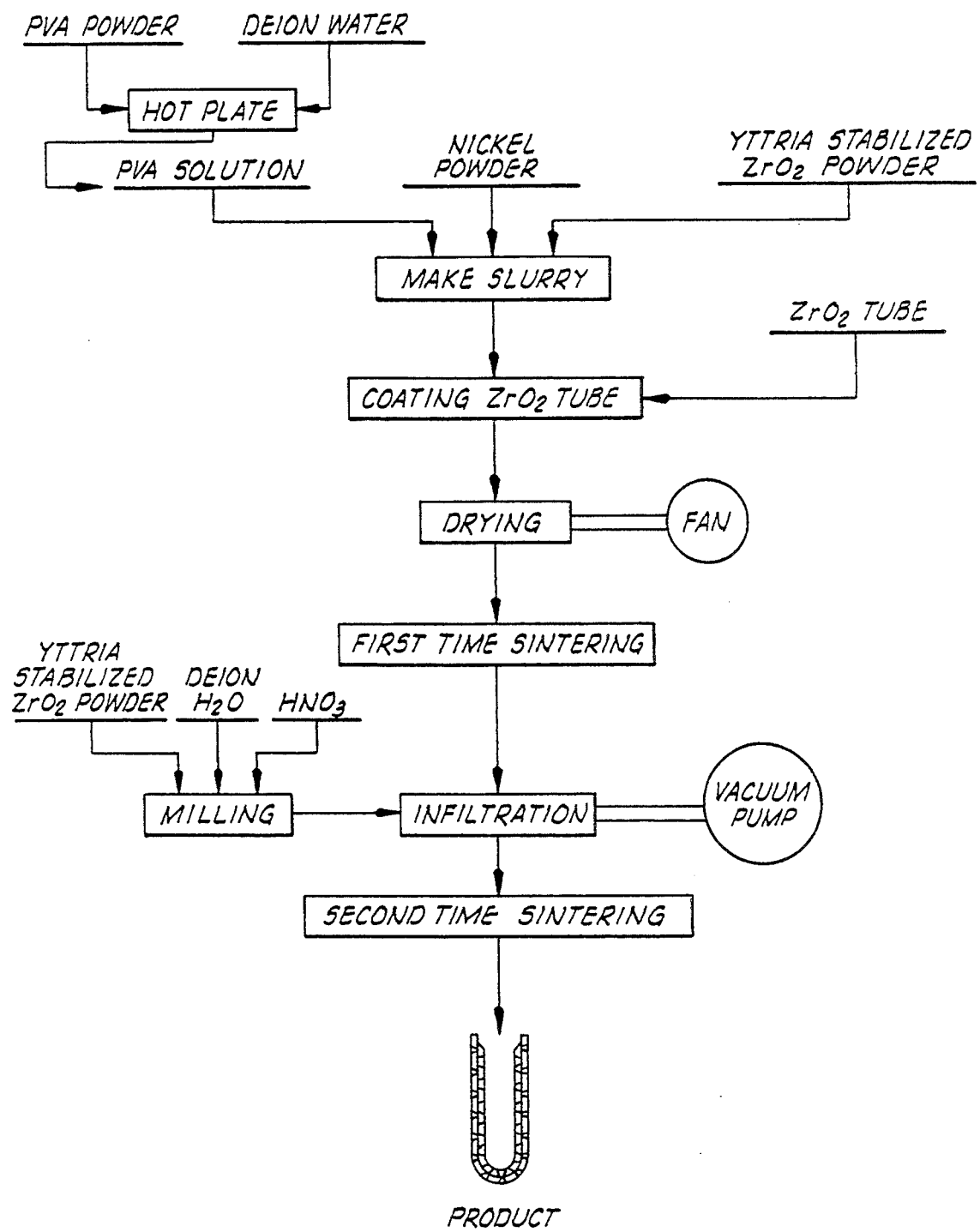
FIG. 10 is a flow chart for the fabrication of Ni-$ZrO_2$ cermet electrodes.

The process shown in FIG. 10 consists of filling the closed zirconia tube at room temperature with a slurry of Ni powder (60 wt. %), $ZrO_2$ powder (5 wt. % of Ni powder), and PVA solution (40 wt. % of a 6% Polyvinyl alcohol (PVA) solution). The tube is then inverted and the slurry is allowed to run out leaving a layer of slurry adhering to the walls of the tube. The tube is then turned horizontally and is slowly rotated at a steady speed during the drying process to form a uniform slurry layer. After the slurry has dried, the tube is sintered at 1100)C for 17 hours under a nitrogen atmosphere with 2% water vapor, followed by natural cooling under an atmosphere of nitrogen with 5% hydrogen. At the end of this sintering step, a porous layer of nickel adhering to the walls of the zirconia tube is obtained.

Figure 11:
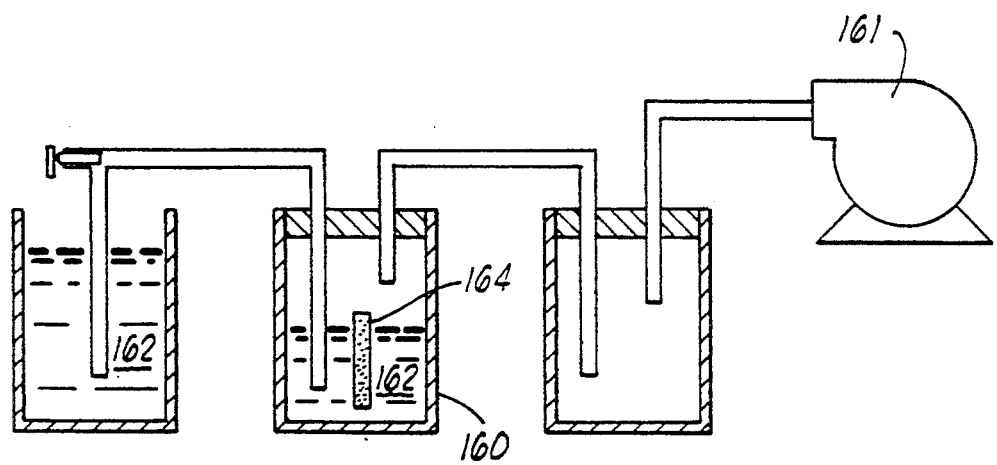
FIG. 11 is a schematic illustration showing the infiltration step of the flow chart of FIG. 10 in greater detail.

The zirconia tube is then introduced into vacuum infiltration chamber 160 shown in FIG. 11. Vacuum chamber 160 is maintained at a pressure of 5 torr by pump 161 and a zirconia slurry 162 containing 30 vol.% $ZrO_2$, 70 vol. % water and 3 ml of (4N) nitric acid is introduced into the chamber in order to completely immerse the zirconia tube 164 in the slurry. Then vacuum chamber 160 is opened to the atmosphere and zirconia slurry 160 partially infiltrates the pores of the nickel layer that is present on the walls of zirconia tube 164. Following this infiltration step, zirconia tube 164 is sintered for the second time at 1200° C. for 7 hours under an atmosphere of nitrogen with 5% hydrogen.

The final product is a zirconia tube with a layer of nickel-zirconia cermet adhering to the walls of the tube. It was not possible to physically remove the cermet from the zirconia tube without fracturing the electrode which demonstrated that the cermet adhered well to the zirconia substrate.

The procedure outlined above is ideally suited for depositing a Ni-$ZrO_2$ cermet on either outer or inner walls of a zirconia tubular electrolyte. The process can also be used to deposit cermet electrodes on a side of a planar cell.

Figure 12:
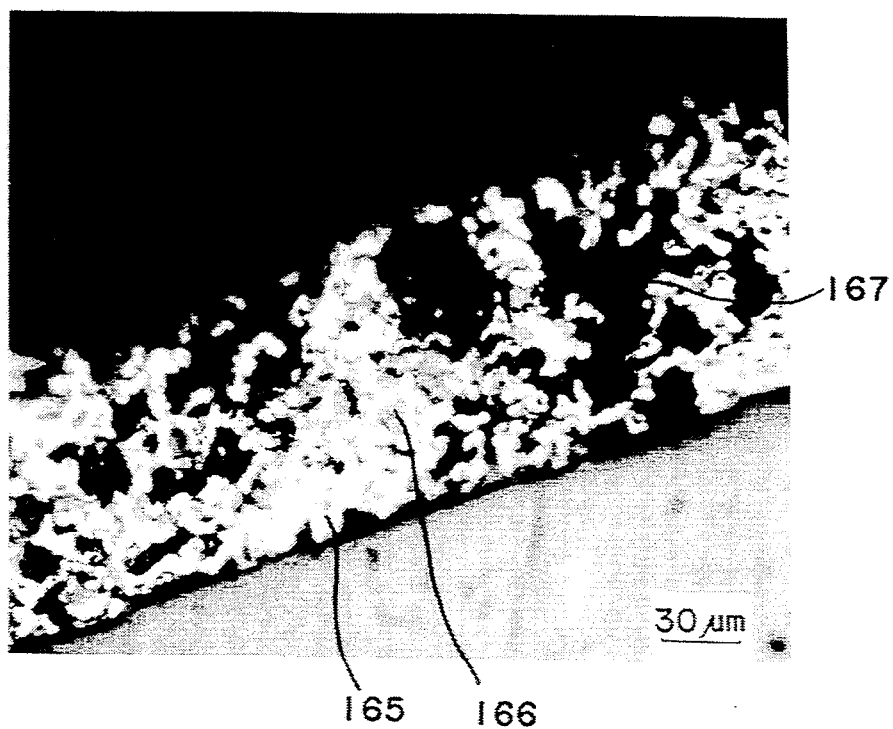
FIG. 12 is an optical micrograph of a cermet electrode having a porosity of 36.6%.

Several Ni-$ZrO_2$ cermet electrodes were deposited according to the foregoing method, and the porosity measurements conducted on three of these electrodes are tabulated in Table I. These three porosity measurements typically represent the average (33.7%), the lowest (30.4%) and the highest (36.6%) porosity values. These measurements indicate that the foregoing process can consistently deposit cermet electrodes having porosity within a narrow range (30% to 37%). The optical micrograph of FIG. 12 shows a sectioned cermet electrode (Sample #1) used in the porosity study. This micrograph shows the typical structure of the cermet in terms of the distribution of white nickel areas 165, grey zirconia particles 166, and dark pores 167.

Figure 13:
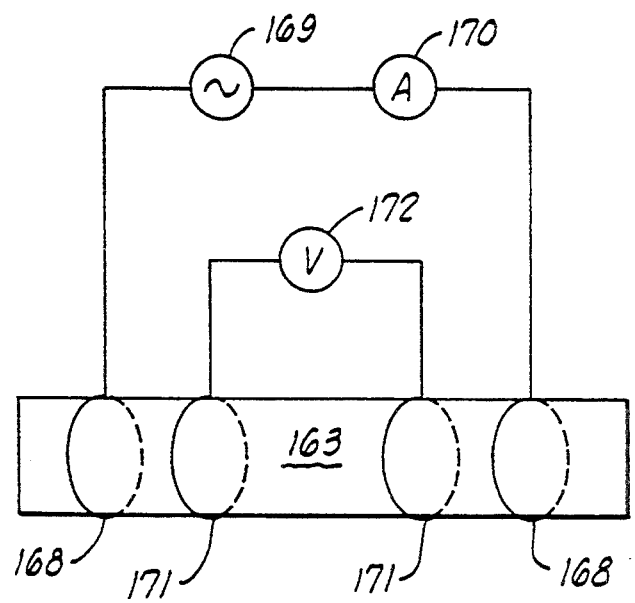
FIG. 13 is a schematic illustration of the configuration used for measuring the sheet resistance of the cermet electrodes.

The sheet resistance, also referred to as the "spreading resistance", of a Ni-ZrO$_2$ cermet electrode 163 is measured using the four terminal technique. A schematic of the setup is shown in FIG. 13. Two end terminals 168 are 3 to 7 cm apart and are connected to power supply 169 (KEPCO MSK 10-10M) in series with ammeter 170. Two inner terminals 171 are 1.7 to 3 cm apart and are connected to voltmeter 172. The four terminals are constructed by tightly wrapping 0.5 mm diameter nickel wires around the cermet that is deposited over the yttria-stabilized zirconia tube. A ceramic paste is also applied at the areas of contact between the nickel wires and the cermet to insure proper contact when the system is heated to high temperatures (1273 K–1473 K). The high temperature measurements were all made in a 5%H$_2$-N$_2$ environment in order to prevent oxidation of the nickel. The sheet resistance (spreading resistance) of the Ni-ZrO$_2$ cermet (S$_R$) in such an arrangement can be expressed as:

$$S_R = \sigma = I \times L$$

where
p is the resistivity of the cermet
$\sigma$ is the thickness of the cermet layer
V is the voltmeter reading
I is the ammeter reading
C is the circumference of the tube and
L is the spacing between the two inner terminals.

The thickness of the deposited cermet electrodes varied from 150 microns to 30 microns. The room temperature sheet resistance of these electrodes varied from 0.0064 ohms per square to 0.019 ohms per square. Three typical room temperature sheet resistance measurements are tabulated in Table II.

In order to evaluate the long term stability of these electrodes, the sheet resistances of these electrodes were measured as a function of time at 1273 K, 1373 K and 1473 K. These measurements are plotted in FIG. 14. It can be seen from FIG. 14 that the sheet resistance of the cermet, between 1273 K and 1473 K, did not decrease with holding time. This indicated that the electrodes did not undergo any major sintering at these temperatures. However, there is a very slight initial increase in the value of the sheet resistance of these electrodes. For instance, when the cermet electrodes are held at 1473 K, 1373 K and 1273 K, the corresponding increases in the value of the sheet resistance during the first 30 hours of annealing are 9.1%, 5.6% and 2.2%, respectively. But, after 30 hours, the sheet resistances of these electrodes do not continue to increase and they become quite stable. This observation suggests that, during the first 30 hours of annealing, the nickel particles may undergo some slight shrinkage which interrupts their connectivity.

Optical micrographs of a cermet electrode before and after the 100 hour annealing treatment at 1373 K are shown in FIGS. 15 and 16, respectively. From these micrographs, it is evident that the cermet electrodes do not undergo any noticeable structural changes during annealing. Furthermore, since the overall increase in sheet resistance is very small in 100 hours, it is also not possible to distinctly identify the microstructural changes associated with this increase.

Increasing the thickness of the cermet electrode decreases the spreading resistance of the electrode. However, increasing the thickness, depending on the porosity of the cermet, increases resistance to gas phase diffusion which can in turn result in higher polarization losses. Therefore, there is an optimum cermet thickness beyond which the polarization losses begin to dominate. Best cell performance was obtained when these electrodes had thickness between 50 and 150 microns.

Solid oxide refining devices having these Ni-ZrO$_2$ cermet electrodes were successfully operated at 1473 K to extract oxygen out of molten metals. Each cell operated for more than 100 hours at 1473 K and also underwent at least ten thermal cycles between 1473 K and room temperature.

TABLE I

Typical Data on Porosity Measurement

| | Sample #1 | Sample #2 | Sample #3 |
|---|---|---|---|
| Porosity | 36.6% | 33.7% | 30.4% |

TABLE II

Typical Sheet Resistance Measurement Data at Room Temperature

| Sample No. | L(cm) | V(mV) | I(a) | Sheet resistance (ohm/square) | Average (ohm/square) |
|---|---|---|---|---|---|
| 1 | 3 | 28.12 | 2.01 | 1.89E-02 | 1.89E-02 |
| | | 25.44 | 1.82 | 1.89E-02 | |
| | | 21.85 | 1.56 | 1.89E-02 | |
| | | 17.66 | 1.26 | 1.89E-02 | |
| 2 | 1.7 | 5.43 | 2.01 | 6.44E-03 | 6.43E-03 |
| | | 4.73 | 1.75 | 6.44E-03 | |
| | | 3.34 | 1.24 | 6.42E-03 | |
| | | 2.32 | 0.86 | 6.43E-03 | |
| 3 | 1.35 | 4.97 | 2.01 | 7.42E-03 | 7.41E-03 |
| | | 4.30 | 1.74 | 7.41E-03 | |
| | | 3.45 | 1.40 | 7.39E-03 | |
| | | 2.92 | 1.18 | 7.42E-03 | |

P.S. Circumference (C) for All Three Samples is 4.05 cm.

EXAMPLE 5

Example 5 is provided to show how a continuous electrochemical refining process can be conducted according to the method of the invention.

A ferrous melt having an initial oxygen impurity level of 500 ppm can be electrochemically refined to less than 1 ppm oxygen impurity in a continuous process as shown schematically in FIG. 17.

FIG. 17 shows how impurity-containing metal melt 180 can be continuously electrochemically refined according to the method of the invention by flowing impurity-containing metal melt 180 through electrolyte tube melt refining chamber 182 bounded by electrolyte tube walls 184 having electrode 186 deposited on outer surface 188 of the electrolyte tube walls 184 so that it is in contact with refining gas stream 190 flowing in a direction given by arrow 192 which is a direction opposite to the direction of flow of impurity-containing metal melt 180 as indicated by arrow 194. Refining gas 190 has a very low impurity concentration so that transport of the impurity occurs from impurity-containing metal melt 180 through electrolyte tube walls 184. For removal of an oxygen impurity, refining gas 190 can be a reducing gas mixture such as $H_2/CH_4$.

Electrode 186 is short-circuited to metal melt 180 by electrical conductor 196. For a non-metallic melt such as a metal oxide or metal oxide slag, another electrode can be provided in the interior of the tube walls which is in contact with the melt and the two electrodes short-circuited as described earlier.

The flow rates of impurity-containing melt 180 and of refining gas 190, respectively, as well as the impurity concentration of refining gas 190, refining temperature, and solid electrolyte 184 composition, and thickness as well as the surface area of the solid electrolyte ionic conductor chamber walls in contact with the impurity-containing melt and refining gas can be selected so that a refined melt of a desired impurity content can be produced according to the foregoing continuous electrochemical refining process.

The technique can also be applied to non-ferrous melts and to melts containing impurities other than oxygen.

EXAMPLE 6

The following Example is provided to show how a low carbon steel melt having an oxygen content in the range of from about 400–600 ppm can be deoxidized using the electrochemical refining method of the invention to produce a melt having an oxygen concentration of less than or equal to 50 ppm.

The oxygen-containing low carbon steel melt was deoxidized using deoxidizing apparatus 80 shown schematically, in cross section, in FIG. 5. An alumina crucible was filled with a low carbon steel charge weighing 775 g having an initial oxygen concentration of 407 ppm and heated to 1873 K using an induction furnace with a thin graphite susceptor. A positive pressure (2–5 psi) of an inert atmosphere such as argon is provided through argon inlet 92 at the top of the melt. The melt was stirred by induction stirring.

As in foregoing examples, a reducing gas is separated from the melt by the oxygen ion-conducting solid electrolyte. Oxygen ions are transported from the melt through the solid electrolyte, reduced to form oxygen gas and exhausted.

To deoxidize the low carbon steel melt, refining device assembly 104 as shown in FIG. 5 was dipped into the low carbon steel melt and flushed with a reducing gas (100–300 cc/min hydrogen and 100 ppm $CH_4$ characterized by an oxygen partial pressure of in the range of from about $10^{-14}$–$10^{-12}$ atm) introduced through reducing gas inlet 101 and flowed through alumina tube 102. Gas exiting alumina tube 102 passes through oxygen sensor 106 from exhaust port 108 with the direction of flow being indicated by arrow 110 in order to determine the oxygen potential of the reducing gas and is exhausted from oxygen sensor 106 through oxygen sensor exhaust port 112 as indicated by arrow 114.

In order to withstand the higher operating temperature of the low carbon steel refining process, electrical wiring and electrodes must be fabricated from more refractory materials than those used in lower temperature copper refining processes. Molybdenum wire 116 is sintered to molybdenum-zirconia cermet electrode 118, extends out of alumina tube 102 and is connected to one terminal of bipolar switch 120. The molybdenum wire is never in direct contact with the low carbon steel melt 84 and instead is connected to a lanthanum chromite ceramic electrode at the end of the molybdenum wire in closest proximity to the melt. It is the lanthanum chromite electrode which dips into the low carbon steel melt 84 through argon inlet tube 92.

The molybdenum-zirconia cermet electrode is prepared using an electrochemical vapor deposition (EVD) process according to which a slurry of molybdenum powder, polyvinyl alcohol and zirconia powder is coated as a thin layer along the interior walls of a zirconia tube and heated to 1200 C. in an EVD reactor so that the polyvinyl alcohol evaporates, leaving gaps between the molybdenum particles. A mixture of $ZrCl_4$ and $YCl_3$ in a ratio selected so that the deposit has a ratio of $(ZrO_2):Y_2O_3$ as 85:15 along with $H_2$ (500 cc/min) and Ar (800 cc/min) gas is flowed inside the tube while air or oxygen is flowed outside the tube. As a result of the gradient in oxygen concentration existing across the tube walls, oxygen ions migrate through the tube wall to the side of the tube wall in contact with the Cl-containing gases where they react to deposit $(ZrO_2)_{0.85}(Y_2O_3)_{0.15}$ which is yttria-stabilized zirconia in-between the molybdenum particles thereby creating a cermet electrode with a morphology which is adherent to the zirconia tube, porous, characterized by a low sheet resistance and which does not sinter during operation of the refining device. Molybdenum-zirconia cermet electrodes prepared using the EVD process have improved adherence properties and lower contact resistance, approximately $2\Omega$, by comparison with the adherence properties and the $3–4\Omega$ contact resistance of cermet electrodes prepared according to the method described in Example 4.

Figure 18:
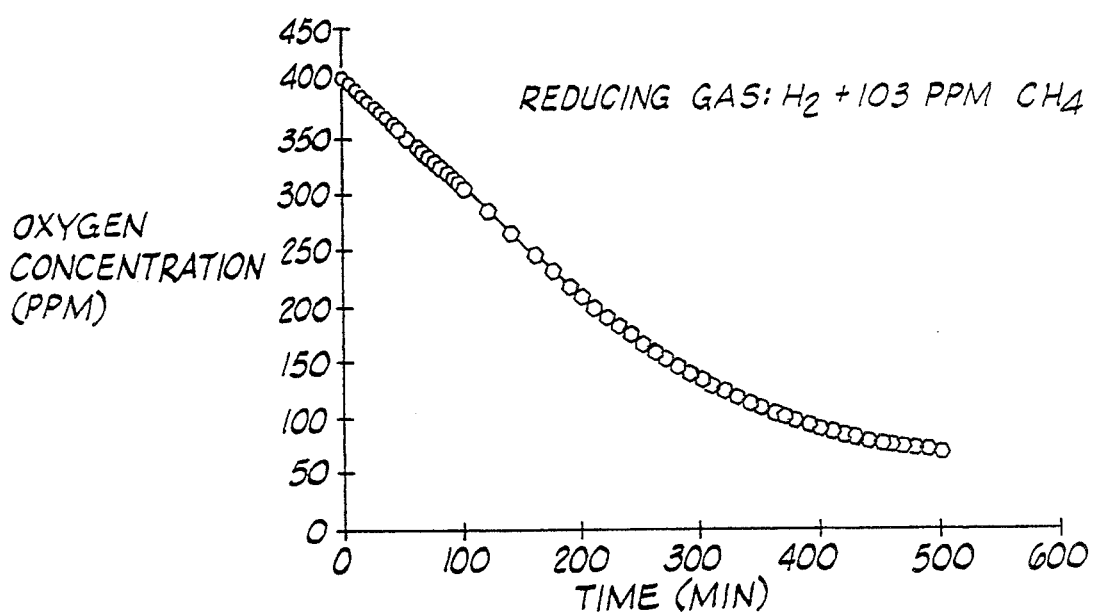
FIG. 18 is a graph showing oxygen concentration as a function of time during electrochemical refining of a low carbon steel melt according to EXAMPLE 6.

The concentration of oxygen in the low carbon steel melt can be determined as already described and the results of such measurements are plotted in FIG. 18 which shows oxygen concentration as a function of time over which the refining process is performed.

Figure 19:
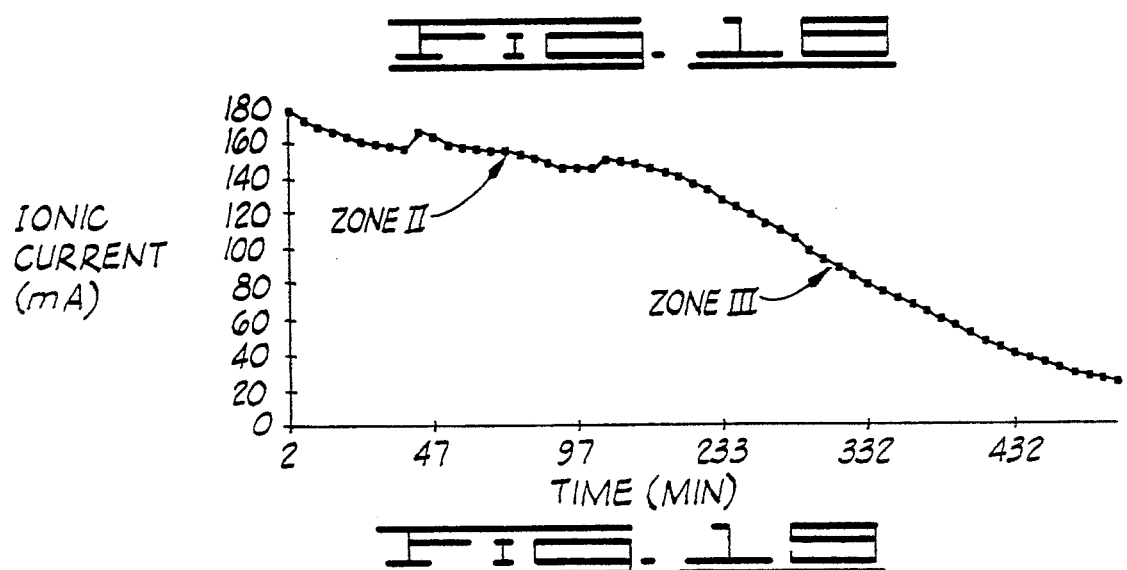
FIG. 19 is a graph showing ionic current as a function of time as measured during the electrochemical refining of a low carbon steel melt according to the method of the invention.

FIG. 19 shows ionic current of a short-circuited refining device as a function of time which shows the rate of transport of oxygen ions through the zirconia electrolyte. Zone II indicates that the deoxidation process is controlled by transport through the electrolyte and Zone III indicates that the deoxidation process is controlled by mass transport through the melt.

Figure 20:
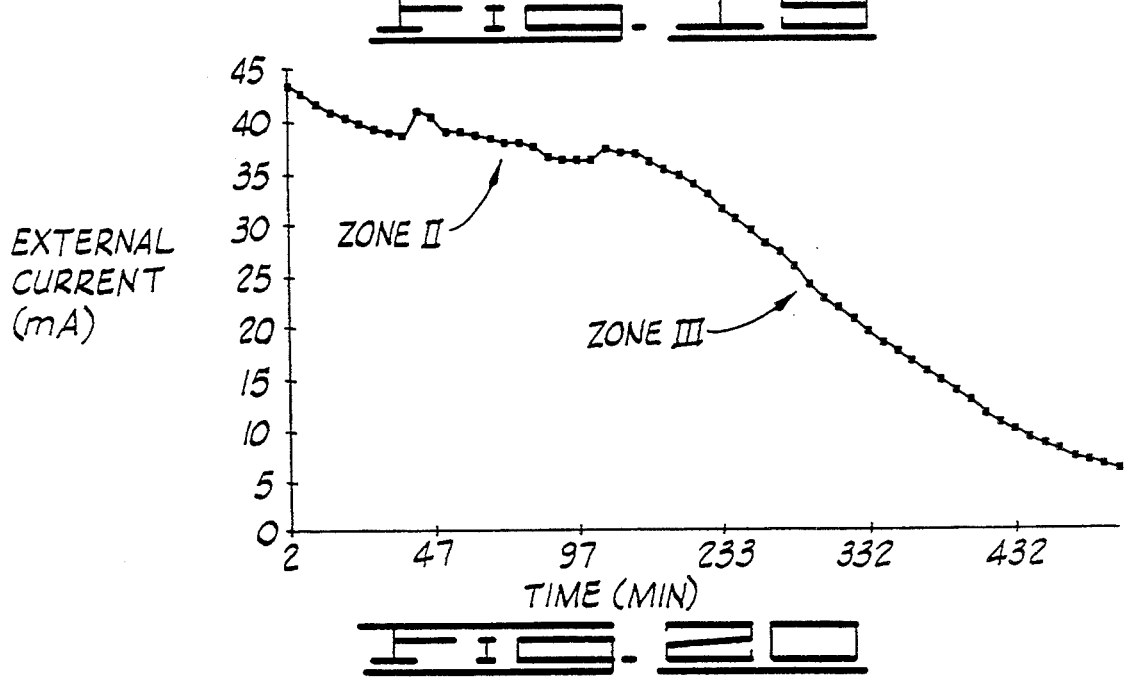
FIG. 20 is a graph showing external current as a function of time as measured during electrochemical refining of a low carbon steel melt according to the method of the invention.

FIG. 20 shows external current which is measured using an ammeter. The external current which is the same as the short circuit current is related to the ionic current by the following equation:

$$I_{ion} = I_{ex}\left(\frac{R_e + R_{ex}}{R_e}\right).$$

where $R_e$ is the electronic resistance of the electrolyte at 1873 K and $R_{ex}$ is the external resistance. In particular, Zone II indicates once again that the deoxidation process is controlled by transport through the electrolyte and gone indicates that the deoxidation process is controlled by mass transport through the melt.

Thus, the present invention is well adapted to carry out the objects and obtain the ends and advantages mentioned as well as those inherent therein. While presently preferred embodiments of the invention have been described herein, it is to be understood that modifications and changes can be made in the method and apparatus of the invention without departing from the spirit or scope of the invention as set forth in the following claims.

What is claimed is:

1. A method for electrochemically refining a low carbon steel melt comprising the steps of:
   (1) providing a low carbon steel melt including an impurity and characterized by a first impurity concentration;
   (2) providing a refining gas;
   (3) exposing said low carbon steel melt to a refining device wherein said refining device further comprises a solid electrolyte ionic conductor, including said impurity as an ionically conductive species and characterized by a solid electrolyte electronic conductivity in electrical contact with an electrode, a refining gas inlet and a gas outlet;
   (4) introducing into said refining gas inlet said refining gas wherein said refining gas is further characterized by a second impurity concentration less than said first impurity concentration and wherein said second impurity concentration is selected to result in transport of said impurity from said low carbon steel melt and through said solid electrolyte ionic conductor driven by the difference between said first impurity concentration in said low carbon steel melt and said second impurity concentration in said refining gas and resulting in removal of said impurity from said low carbon steel melt to produce a refined melt characterized by a third impurity concentration, less than said first impurity concentration; and
   (5) short-circuiting said electrode so that transport of said impurity from said melt to said refining gas is not limited by said solid electrolyte electronic conductivity.

2. The method of claim 1 further comprising a step of short-circuiting said electrode to said low carbon steel melt.

3. The method of claim 1 wherein said impurity is oxygen.

4. The method of claim 1 wherein said solid electrolyte ionic conductor is characterized by an ionic conductivity and said ionic conductivity is greater than about 0.001 $(cm)^{-1}$ at a temperature greater than about 300 C.

5. The method of claim 4 wherein said solid electrolyte ionic conductor is yttria-stabilized zirconia.

6. The method of claim 1 wherein said solid electrolyte ionic conductor is characterized by a melt facing surface and by a refining gas-facing surface and further comprising a step of depositing a porous cermet on said refining gas-facing surface to form said electrode.

7. The method of claim 6 further comprising a step of providing a Mo-$ZrO_2$ cermet electrode.

8. The method of claim 7 wherein said Mo-$ZrO_2$ cermet electrode is deposited by an electrochemical vapor deposition process.

9. The method of claim 8 wherein said reducing gas is a $H_2$ and $CH_4$ gas mixture.

10. The method of claim 9 wherein said reducing gas is further characterized by an oxygen impurity partial pressure and said oxygen impurity partial pressure is in the range of from about $10^{-14}$ atm to about $10^{-12}$ atm.

11. The method of claim 10 wherein said reducing gas is further characterized by a reducing gas flow rate and said reducing gas flow rate is in the range of from about 15 cc/min-$cm^2$ of electrolyte surface to about 40 cc/min-$cm^2$ of electrolyte surface depending on the rate of impurity removal.

12. The method of claim 1 wherein said refining gas is a reducing gas.

13. The method of claim 1 further comprising a step of impressing an electromotive force across said electrode and a second electrode to enhance refining kinetics.

14. The method of claim 1 further comprising a step of stirring said melt by an induction stirring method.

15. The method of claim 1 wherein said third impurity concentration is in the range of from about 1 ppm to about 1000 ppm.

16. A method for continuously electrochemically refining a low carbon steel melt comprising:
   (1) providing a melt refining chamber having at least one of its walls composed of a solid electrolyte ionic conductor including an impurity ionically conductive species, a melt inlet and a melt outlet and an electrode deposited on at least one of said refining chamber walls;
   (2) continuously flowing in a first direction a low carbon steel melt containing said impurity and characterized by a first impurity concentration into said melt inlet and into contact with said solid electrolyte ionic conductor chamber walls;
   (3) continuously flowing in a second direction, opposite to said first direction, a refining gas containing said impurity and characterized by a second impurity concentration lower than said first impurity concentration and selected to result in transport of said impurity from said melt through said solid electrolyte ionic conductor chamber walls driven by a difference between said first impurity concentration and said second impurity concentration;
   (4) exposing said electrode to said refining gas, separating said electrode from said low carbon steel melt by said solid electrolyte ionic conductor and short-circuiting said electrode to produce a refined low carbon steel melt characterized by a third impurity concentration less than said first impurity concentration; and
   (5) continuously removing said refined low carbon steel melt at said melt outlet.

17. The method of claim 16 wherein said first electrode is short-circuited with said low carbon steel melt.

* * * * *

UNITED STATES PATENT AND TRADEMARK OFFICE
CERTIFICATE OF CORRECTION

PATENT NO. : 5,443,699
DATED : Aug. 22, 1995
INVENTOR(S) : Uday B. Pal et al.

It is certified that error appears in the above-identified patent and that said Letters Patent is hereby corrected as shown below:

Title page, item [*], notice: change "The portion of the term of this patent subsequent to May 17, 2011 has been disclaimed." to -- The portion of the term of this patent that would extend beyond the term of United States Patent No. 5,312,525 has been disclaimed.--

Title page, other publications, page 2, last line: change "*Journals*" to --*Journal*--.

Column 3, line 18: after "are", delete "S".
Column 6, line 35: after "Ru-$ZrO_2$", delete ";".
Column 6, line 41: after "involving", delete "30".
Column 9, line 50: after "$10^{-2}$", change "arm" to --atm--.
Column 9, line 53: after "$10^{-12}$", change "arm" to --atm--.
Column 10, line 57: after "X-9", change "TM" to --™--.

UNITED STATES PATENT AND TRADEMARK OFFICE
CERTIFICATE OF CORRECTION

PATENT NO. : 5,443,699
DATED : Aug. 22, 1995
INVENTOR(S) : Uday B. Pal, et al.

It is certified that error appears in the above-identified patent and that said Letters Patent is hereby corrected as shown below:

Column 10, line 59: after "AUTOSTIC", change "TM" to --™--.
Column 14, line 27: after "1100" change ")" to --°--.
Column 18, line 61: after "and", change "gone" to --Zone III--.
Column 20, line 4: after "claim", change "8" to --12--.
Column 20, line 9: after "about", change "10" to --10--.

Signed and Sealed this

Fourteenth Day of November, 1995

Attest:

BRUCE LEHMAN

*Attesting Officer*     *Commissioner of Patents and Trademarks*